(12) United States Patent  
Epstein et al.

(10) Patent No.: US 8,183,731 B2
(45) Date of Patent: May 22, 2012

(54) ELECTRO-MOTIVE MACHINE USING HALBACH ARRAY AND ELECTRONS TRAPPED IN ELECTROMAGNETIC PROVIDING CURRENT

(76) Inventors: Martin Epstein, Seminole, FL (US); Jon Eric Harms, Seminole, FL (US)

( * ) Notice: Subject to any disclaimer, the term of this patent is extended or adjusted under 35 U.S.C. 154(b) by 152 days.

(21) Appl. No.: 12/460,461

(22) Filed: Jul. 16, 2009

(65) Prior Publication Data
US 2011/0025239 A1    Feb. 3, 2011

Related U.S. Application Data

(63) Continuation-in-part of application No. 11/198,815, filed on Aug. 5, 2005, now Pat. No. 7,352,096.

(51) Int. Cl.
H02K 21/12    (2006.01)

(52) U.S. Cl. .................. 310/156.43; 310/43; 310/268
(58) Field of Classification Search ............ 310/156.43, 310/261, 268; 322/24; 290/1 C
See application file for complete search history.

(56) References Cited

U.S. PATENT DOCUMENTS

| | | | |
|---|---|---|---|
| 5,625,276 A * | 4/1997 | Scott et al. | 322/24 |
| 6,118,186 A * | 9/2000 | Scott et al. | 290/40 B |
| 6,545,852 B1 * | 4/2003 | Arnold | 361/160 |
| 6,794,777 B1 * | 9/2004 | Fradella | 310/74 |
| 6,849,960 B2 * | 2/2005 | Hartman et al. | 290/1 C |
| 7,352,096 B2 * | 4/2008 | Dunn et al. | 310/156.43 |
| 2005/0007042 A1 * | 1/2005 | Moore et al. | 318/139 |

* cited by examiner

Primary Examiner — Thanh Lam

(57) ABSTRACT

A Halbach array is radially disposed in an environment optimized for efficiency and controlled for efficient generation and use of power in order to generate, establish, and maintain a desired level of rotational energy with enhanced efficiency.

20 Claims, 13 Drawing Sheets

ELECTRO-MOTIVE MACHINE USING HALBACH ARRAY AND ELECTRONS TRAPPED IN ELECTROMAGNETIC PROVIDING CURRENT

This is a continuation part from Ser. No. 11/198,815, filed Aug. 5, 2005, now U.S. Pat. No. 7,352,096 issued on Apr. 11, 2008.

FIELD OF THE INVENTION

The invention relates to the exploitation of electronic phenomena which may occur in devices and methods for the generation of rotational energy from a Halbach array for the production of electricity and other useful applications.

BACKGROUND OF THE INVENTION

Halbach magnetic arrays have enabled electrical motors to achieve substantial new efficiencies and powers than were previously possible. Various applications of these types of magnetic arrays have included such things as the bullet train, rotational electric batteries, and a variety other mechanical and electrical devices.

Since the Halbach array was first developed it has been applied to various applications in order to exploit the relationship between kinetic and electrical energy which are uniquely related and can be transitioned by magnetic fields. For instance, in U.S. Pat. No. 6,758,146 issued to Post on Jul. 6, 2004, a pair of Halbach arrays are magnetically and structurally connected so as to provide energy for propulsion of the arrays along a track. In this invention the Halbach arrays actually result in magnetic levitation which may be capable of propelling a vehicle or other conveyance along the track.

The interaction of the Halbach arrays with each other combined with the interaction of the Halbach arrays with electrically independent track circuit arrays is intended to result in propulsion of the Halbach arrays (together with any objects attached to them) with a high level of energy efficiency. While the invention taught by Post teaches an efficient use of energy directed towards a specific result it does not teach the generation of power.

In U.S. Pat. No. 6,768,407, issued to Kohda, et al, on Jul. 27, 2004, a magnetic field generator is taught. In this invention a Halbach array is used to supply a magnetic circuit for the purpose of providing a more powerful permanent magnetic field for use in high energy applications, such as particle accelerators, magnetic resonance imaging machines, and so forth. This device shows the effectiveness of Halbach array is in concentrating and efficiently transitioning between mechanical and electrical energy.

In another invention by Post, U.S. Pat. No. 6,858,962, issued on Feb. 22, 2005, a Halbach array is used to regulate voltage and power into a form and level which may be useful in reliably propelling a vehicle or supplying energy to a source requiring a specific level of voltage and current. It is a power regulation device rather than a power generator, per se.

Integrated circuitry has permitted the luxury of increasingly precise control over the flow of electrical circuits and has enabled automated decision-making concerning the precise application of electrical energy at rapid speeds in order to achieve optimal results in a variety of endeavors.

Along with the improvements in the control of the flow of electrical energy and the enabling of precise delivery of electrical energy by automated decision-making, either through fields or currents, has also developed improved understanding and the ability to exploit and manipulate electromagnetic properties of various elements. This has enabled the production of permanent magnets and cores for electromagnets which achieve previously unobtainable properties in the ability of materials to retain magnetic flux as desired onto create electromagnets which may rapidly adapt to produce a high level of magnetic flux and then have the flux either reduced or reversed as may be desired.

The electrical and electromagnetic characteristics of the fields and currents created by each apparatus of this sort is unique and may afford potential for further and enhanced efficiencies. For instance, certain waveforms are more adaptable to harness energy in a different manner and such may offer advantages. The device taught in the invention taught in U.S. Pat. No. 7,352,096, issued to the present inventors on Apr. 1, 2008, represents a substantial advance in the art. It achieves a high level of efficiency by precisely timing the oscillation of fixed-in-place electromagnetic fields traveling through a series of circumferential permanent magnetic fields to propel a rotor. It would appear that the rapid reversal of the electromagnetic fields associated with the stator consumes a relatively substantial effort in energizing the electromagnets and then loss as the electromagnet is de-energized in order to be reversed. Accordingly, it would be of benefit to find a means of saving this energy as well as facilitating the more rapid energizing and reversal of each of the electromagnets.

The combination of these abilities might be useful in developing a device or apparatus for the generation of electrical energy at relatively small levels of consumption which might more effectively harness the energy from the permanent magnets and achieve an effective generation of rotational energy for a variety of applications from propelling a vehicle or motor to pure power generation without burning fossil fuels or creating nuclear reactions and may be helpful for emergency conditions or to augment commercial power.

While each application must be specifically engineered, the research performed and published to date includes specific limitations of the existing Halbach-type array. If these limitations could be overcome the Halbach-type magnetic array could be applied to a variety of functions.

It is added, however, helpful to recognize the advantages provided by a new and unique power generation, conversion, or storage device in order to take advantage of the opportunities residing therein. With respect to the apparatus taught in U.S. Pat. No. 7,352,096, this advantage could exist in the tendency of the apparatus to not lose energy in the movement of electrons in and out of the electromagnetic coil and the resultant square wave, which allows more efficient conversion to and from a direct current.

SUMMARY OF THE INVENTION

The inventors have previously solved many of the problems inherent in the prior art and achieved a new family of power generation equipment which achieved a much higher efficiency than was previously possible. They have done this by applying the principles of the Halbach-type magnetic array and, by carefully programming the electricity delivered to a series of electromagnets, have managed to efficiently drive a rotor using a relatively smaller amount of electromotive force through the electromagnets in combination with an array of permanent magnets than previously possible.

This was done by applying carefully programmed controlling logic circuitry to a series of radially disposed electromagnets and by adding a "trapping" circuit so as to establish and maintain a desired rate of rotation of a rotor which is adapted with high magnetic density permanent magnets and means to control the rate of rotation of the rotor. In this manner one or more of a series of electromagnets disposed in a radial path need be energized in order to efficiently drive one or more rotors which are adapted with one or more stable permanent magnets mounted upon a radial shaft extending from the rotor.

The electromagnets are, as desired, energized by a current flow which creates a magnetic field which interacts with the permanent magnetic field traveling with the permanent magnet. The permanent magnet will then will receive alternate propelling and attracting forces at the appropriate times to drive the rotor through the next segment of rotation to be received by the next electromagnet. The process may be repeated throughout the entire radial turn of the rotor. When the apparatus is used to generate electricity, for example, the amount of electromagnetic energy required by each electromagnet need only be sufficient enough to produce a magnetic field which will, when reacting with the magnetic field from the permanent magnet, produce a force sufficient to drive the rotor through the magnetic field of the generator and produce an appropriate burst of electricity of the right voltage and current. When used for other purposes the force must be sufficient to overcome whatever load resistance demanded by the particular use.

Essentially, the device is capable of storing in its servicing power supply apparatus increments of direct current bled from the apparatus and, by the appropriate computer programming, use such stored energy in a very efficient manner to produce or maintain rotational energy by supplying an efficient force upon a rotor upon or within which permanent magnets are mounted or stored.

The device may be generally described as a new closed-loop energy generation machine based partially on the Halbach-type array of permanent magnets and partially on the Halbach-type array DC motor generator. This new configuration of the electric machine adds closed-loop characteristics to the energy generation cycle as well as throttle and input/output controls. Basically, in addition to the Halbach demonstrated configuration, this new machine replaces permanent magnets in selected portions of the machine with electromagnets controlled and charged with by-product energy of the moving components. Switching of the energy distribution is controlled by computer code using constants and dynamic variables.

Invention of this new application of the Halbach-type array was not possible until the advent of fast, programmable computer chips, high-speed memory chips, and central-processing-units with integrated circuit board technology. This new configuration is constructed using a circular stationary component (called a stator rail) which contains electromagnets located embedded around the rail that produce controllable electromagnetic fields sequenced by computer code relevant to rotation speed, rotation direction, current rotor position, last rotor position, strength of previous field, and rotor predicted next position. The electromagnets are switched on and off with appropriate polarity and flux strength relevant to proximity of the permanent magnetic arrays located on the moving component (the rotor which mounts the permanent magnets). By electronically reversing the polarity of the selected electromagnet on the stator rail at exactly the correct time during rotation of the rotor, the computer code calculates electromagnetic polarity reversal slightly in advance or behind the equalized attraction/repulsion position and applies appropriate voltage to desired rotational speed, thus producing an additional push/pull rotational force.

This additional force is partially drained from the electric generation components of the machine as electricity using common electric generation commutating technology. This electricity is then routed through transformers and relays that charge sequential capacitors and other power supplies which may be necessary to maintain the operation of the apparatus. When the capacitors are fully charged, the stored electricity is released and modulated to activate the next computer selected electromagnet.

In addition to the closed-loop properties of this new machine, the electro-motive force along with stored kinetic energy of the rotational component is harnessed with geared shaft arrays to produce other work energy. The invention comprises four necessary components. Generally, the four components are a stator to house the electromagnets, a power supply (normally a capacitor or battery or some combination of these) for the electromagnets, a rotor, which mounts or houses permanent magnets, and controlling logic circuitry. The invention results from the selection of specific magnetic materials coupled with the control of magnetic fields by logically controlled circuitry.

When used for electric power generation an iteration of the apparatus may provide electromagnetic coils within the generator which are turned through the power generation magnetic field by one or more rotors which extend radially from the generator shaft and upon which are mounted permanent magnets which rotate along a circumferential rail. Permanently mounted about the circumferential rail are a series of electromagnets. These electromagnets are made of a material which permits rapid magnetization and polarity reversal without significant residual magnetization or degradation of its magnetic properties.

The power supply will normally result from a capacitor or battery and will supply precise bursts of current to be rail mounted electromagnets in order to create the appropriate magnetic conditions for the operation of the device. The power supply may actually received a portion of its stored electricity from the generator itself. The power supply must be capable of precise control with respect to the quality and quantity of stored electrical energy as well as its delivery to be rail mounted electromagnets.

The controller will be adapted with control circuitry which is capable of keeping track of the position of the rail mounted electromagnets with respect to the permanent magnets mounted on the end of the one or more radial rotors extending perpendicularly from the shaft of the generator. The purpose of the controller is to precisely direct electrical current from the appropriate element of the power supply to the designated rail mounted electromagnets at the precise time required to drive the rotor radially about the generator shaft and to turn the generator shaft. This can be done either by magnetically attracting the rotor mounted permanent magnet to the next rail mounted electromagnets or by magnetically driving the rotor mounted permanent magnets from the last rail mounted electromagnets or by doing both at the same time.

Through continued development of the apparatus, in particular taking measurements of the significant operating parameters, the following observations have been made which have led to a remarkable and often noble discovery. This has to do with the efficiency of the apparatus as it approaches higher rotational speeds so that the currents producing the electromagnetic fields are switched on and off more rapidly and the cycles become closer in time to each other. In particular, this phenomena is that it is possible to "trap" electrons within the electromagnetic coil and save them for use in the next cycle.

This has been exploited by providing additional relay circuitry to the electromagnetic coil so that it no longer has a current flow in one direction or another and, at appropriate times, the electro-motive force is switched completely of and the circuit is open so that the electrons within the coil have no path out and are "trapped" within the coil for future use.

Essentially, the invention takes advantage of a disparity in the magnetic properties between the permanent and electromagnets used in the driving magnetic paths and the magnetic properties in the permanent and electromagnets in the power generator and, in a large measure, results in a transfer of stored electricity from the permanent magnets in the rail mounted driving magnetic circuit into electricity. This is enhanced by recognizing and exploiting the electrons trapped in the electromagnetic field producing currents.

It is anticipated that the present invention may be used to provide electric generators, motors and electro-motive devices of all sizes, demands, and purposes including, but not limited to:

Primary and or emergency power generation for single and multifamily homes, commercial, industrial and all buildings and devices currently connected to a power grid. Due to the scalability of this device, the electro-motive machine can be designed for any application. In these applications, the very small amount of energy required to replace energy lost by the electro-motive machine due to natural forces such as gravity or friction can be obtained from the grid;

Primary and or emergency power generation for any application not connected to a power grid regardless of size, energy demand and or purpose. Such uses may include, but are not limited to remote construction sites, powering structures and devices such as well pumps, water treatment and sewage facilities, and military and space applications. In these applications the very small amount of energy required to replace energy lost by the electro-motive machine due to natural forces such as gravity or friction can be periodically obtained from supplemental sources including, but not limited to, hand generators, batteries or generators powered by fossil fuels or natural energy sources;

Providing electrical power to devices not connected to the power grid and currently powered by battery, fossil fuels or natural energy sources of all sizes and power requirements;

Powering, small, miniature and subminiature devices including but not limited to cell phones, pacemakers and other medical devices, flashlights, computers toys, games, switches and cameras;

Uses and devices requiring movement of any type including but not limited to vehicles, conveyor systems, pumps, and industrial, aerospace, military and space applications.

It is then an object of the present invention to provide a more efficient and effective means of converting magnetic energy into rotational energy by the skillful manipulation of electrical currents and electromotive forces.

It is another object of the present invention to provide a means of generating and maintaining consumable electricity from sources other than fossil fuels.

It is another object of the present invention to take advantage of the disparity which can be created in the magnetic properties of various materials to convert and generate consumable energy.

It is another object of the present invention to provide apparatus and method for producing and maintaining an alternative source of energy which is independent of fossil fuels and may, for some realistic period of time, be self-sustaining.

It is another object of the present invention to provide apparatus and method for producing and maintaining an alternative source of energy which considers and takes advantage of the behaviour of electrons within inductive circuits which are subject to rapidly changing and precisely controlled electromotive forces.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

Figure 1:
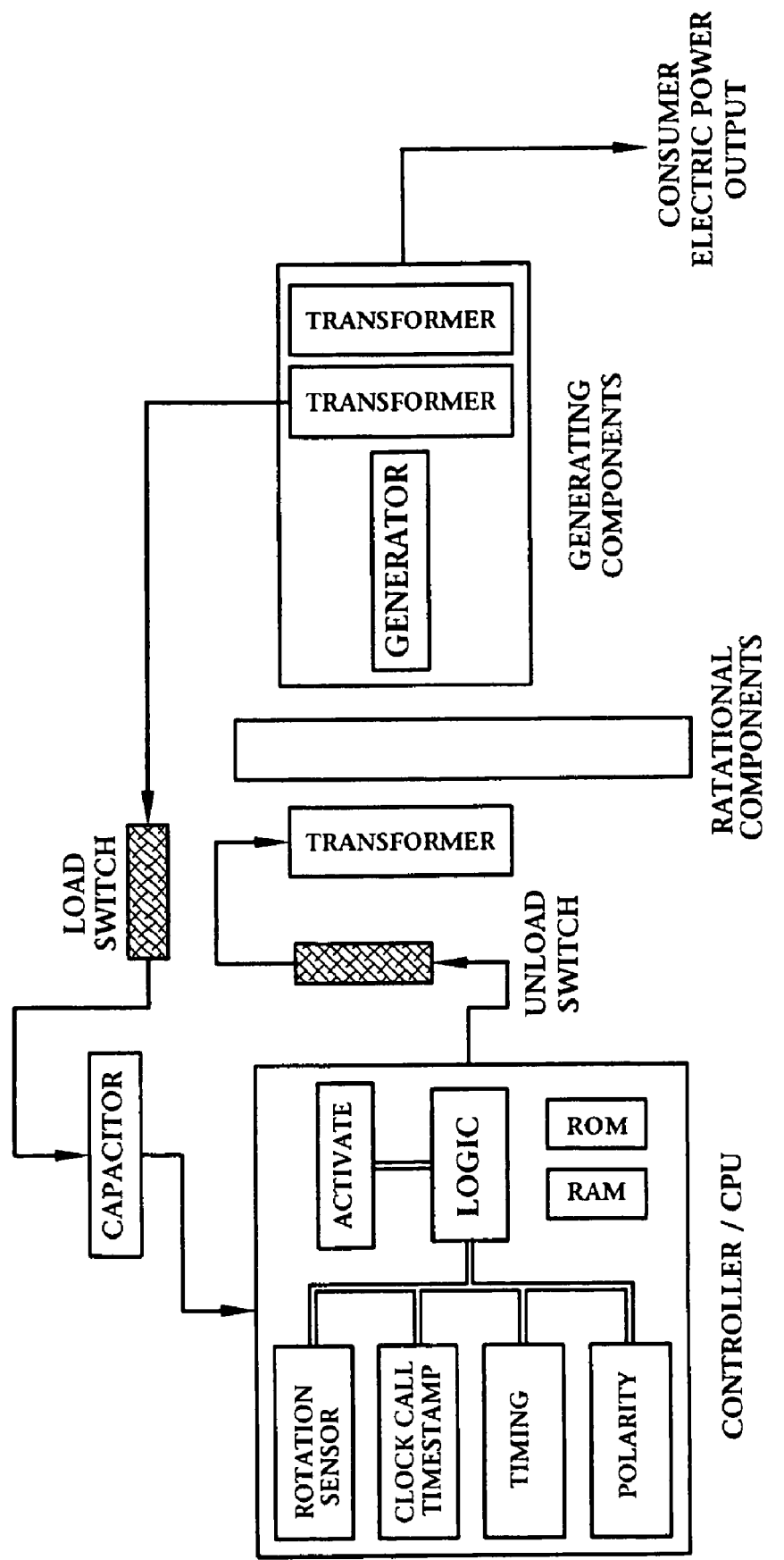
FIG. 1 is a block diagram which is useful in describing the phased operation of a power generator built according to the present invention.

Table 1 depicts the logic sequence which may be used in the process of energizing and de-energizing an electromagnetic coil and in determining which polarity is desired for energization.

Table 2 depicts the parameters burned into the device unique chip of the preferred embodiment of the present invention.

Table 3 depicts the parameters monitored by sensing and controlling software in signal communication with the device-unique chip of the preferred embodiment of the present invention.

Table 4 depicts a predicted efficiency model for a configuration of apparatus built according to the preferred embodiment of the present invention without a blocking circuit.

Table 5 demonstrates the improved efficiencies achieved with the present device.

Table 6 is an example of an algorithm which could be used to control the logic circuitry.

While certain drawings and tables have been provided in order to teach the principles and operation of the present invention, it should be understood that, in the detailed description which follows, reference may be made to components or apparatus which are not included in the drawings. Such components and apparatus should be considered as part of the description, even if not included in such a drawing. Likewise, the drawings may include an element, structure, or mechanism which is not described in the textual description of the invention which follows. The invention and description should also be understood to include such a mechanism, component, or element which is depicted in the drawing but not specifically described.

DETAILED DESCRIPTION OF THE PREFERRED EMBODIMENT

Reference will now be made in detail to the present preferred embodiment of the invention, an example of which is illustrated in the accompanying drawings and which is further described and explained by reference to the accompanying tables. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

While the following description will seek to improve understanding of the invention by describing the various components and elements, it should be considered that certain apparatus may be sufficiently and adequately explained by the accompanying drawings, which are fully incorporated herein, and not require further description. All such apparatus should be considered as part of the specification of the invention for all purposes.

Making reference first to FIG. 1, a power generator constructed according to the preferred embodiment of the present invention is depicted in block diagram format. It can be seen that the stator, rotor, a power supply, sensors, and a circuit controller are all connected in a closed loop cycle. In addition, referring to the block describing the controller, it can be seen that the controller is adapted with inputs relating to the rotation of the rotor, the timing and polarity of the electromagnets, and the overall speed of the device. It can also be seen that the data is processed through the logic circuitry of the controller to make decisions regarding the activation of various electromagnets. Through a switch or relay the electricity from the appropriate power supply, which may have been processed by the controller, is eventually passed to the various electromagnetic rotational components of the stator.

The power generator reflects that the generated power is passed through two transformers. One of these transformers may pass the electricity back to the power supply through a load switch. If the device is properly managed the electricity passed through the load switch and back into the power supply will be sufficient to charge the electromagnets through another cycle of power generation. The excess power may be passed through another transformer to be placed in an appropriate form for power consumption.

Figure 2:
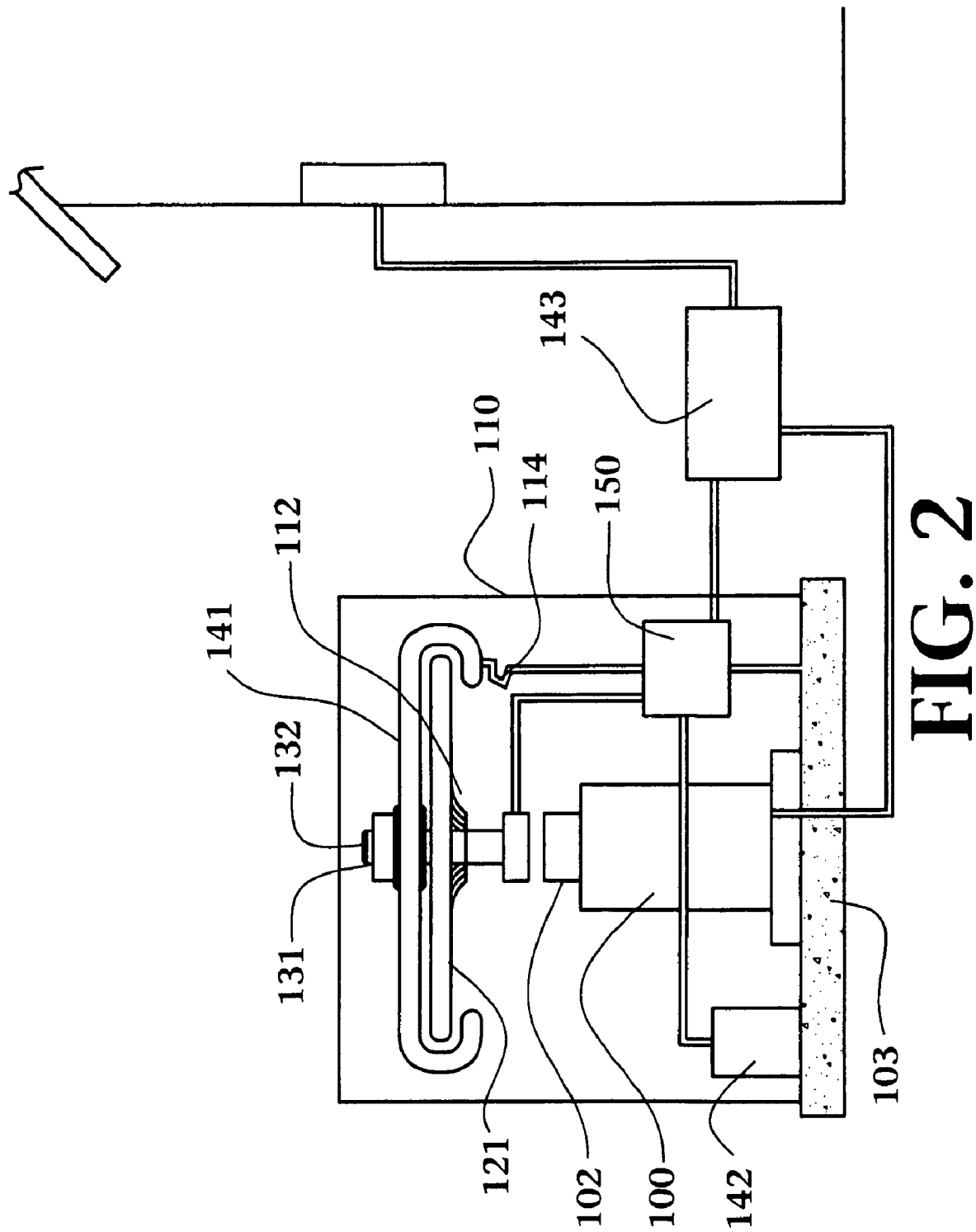
FIG. 2 depicts the positioning of the various components of a generator unit built according to the present invention.

In the preferred embodiment of the present invention as depicted in FIG. 2 it can be seen that a generator (100) is powered by an electromotive machine (110) is housed within an enclosure (101). While the preferred embodiment is described as powering a generator, it is again pointed out that the machine may be used to supply power to any device requiring or consuming rotational energy. A shaft (111) is in rotational communication with a power generator unit (100) by means of a transmission (102). Upon the shaft (111) is further mounted a disk rotor (121) and a housing (131) for a bearing joint (132) to be received by a stator (141). The stator (141) is secured by some reliable means (not depicted) to either the housing (101) or the support base (103). Also mounted upon the shaft (111) in close proximity to the disk rotor (121) is an inductive cooling fan (112).

As depicted in the preferred embodiment of the present invention on FIG. 2 one or more smaller and independent DC generators (114) could be mounted upon the shaft in order to provide the current necessary to operate any portion of the controlling circuitry or to charge any available power supply needed to operate the apparatus or to directly supply the electromagnetic energy used by the apparatus as will be described in greater detail. It should also be noted that the inductive cooling fan (112) and the independent DC generator (114) are alternatives to a variety of means of cooling and supplying the energy for the operation of the device. Additionally, these components may be unnecessary for some applications. For instance, the internal operating power for the device, when used as a power generator as it is in the preferred embodiment, could alternatively be supplied by means of taking a portion of the output energy and transforming it into the proper form and amount. All of these alternatives should be seen as keeping within the spirit and scope of the present invention.

Still making reference to FIG. 2 it can further be seen that a CPU (150) is in electrical signal communication with the stator (141), a power supply (142), and a distribution box (143). These comprise the principal electrical and signal components of the apparatus that may be used to generate electricity. It should be noted that while the power supply (142) has been depicted as a capacitor, any number or combination of electrical power providing components, including but not limited to such as batteries, capacitors, inverters, or mechanical power generation and storage devices, may be used as long as they are capable of storing electricity and releasing it in precise bursts. For instance, each electromagnet could, but need not, be powered by an individual dedicated capacitor which is adapted to store and release the energy needed to ensure the necessary supply is made available when needed.

Having described the general construction and the schematic operation of the apparatus it is now useful to briefly describe, in general terms, how the apparatus may be operated to generate electricity. Magnetic fields (not depicted in FIG. 2) created by electromagnets housed within the stator (141) interact with the magnetic fields from permanent magnets (not depicted in FIG. 2) mounted upon or housed within the disk rotor (121) to establish and maintain a desire rate of rotation of the shaft (111). This rotation may be transmitted through a transmission (102) to a generator (100) in order to power a desire consumer of electrical energy. The logic circuitry within the CPU (150) keeps track of a variety of variables and, based upon the unique engineering of each device, determines the optimal time and electrical current for energizing the electromagnets within the stator (141) and also may control the flow of electricity to and from the power supply (142) and distribution box (143).

Figure 3:
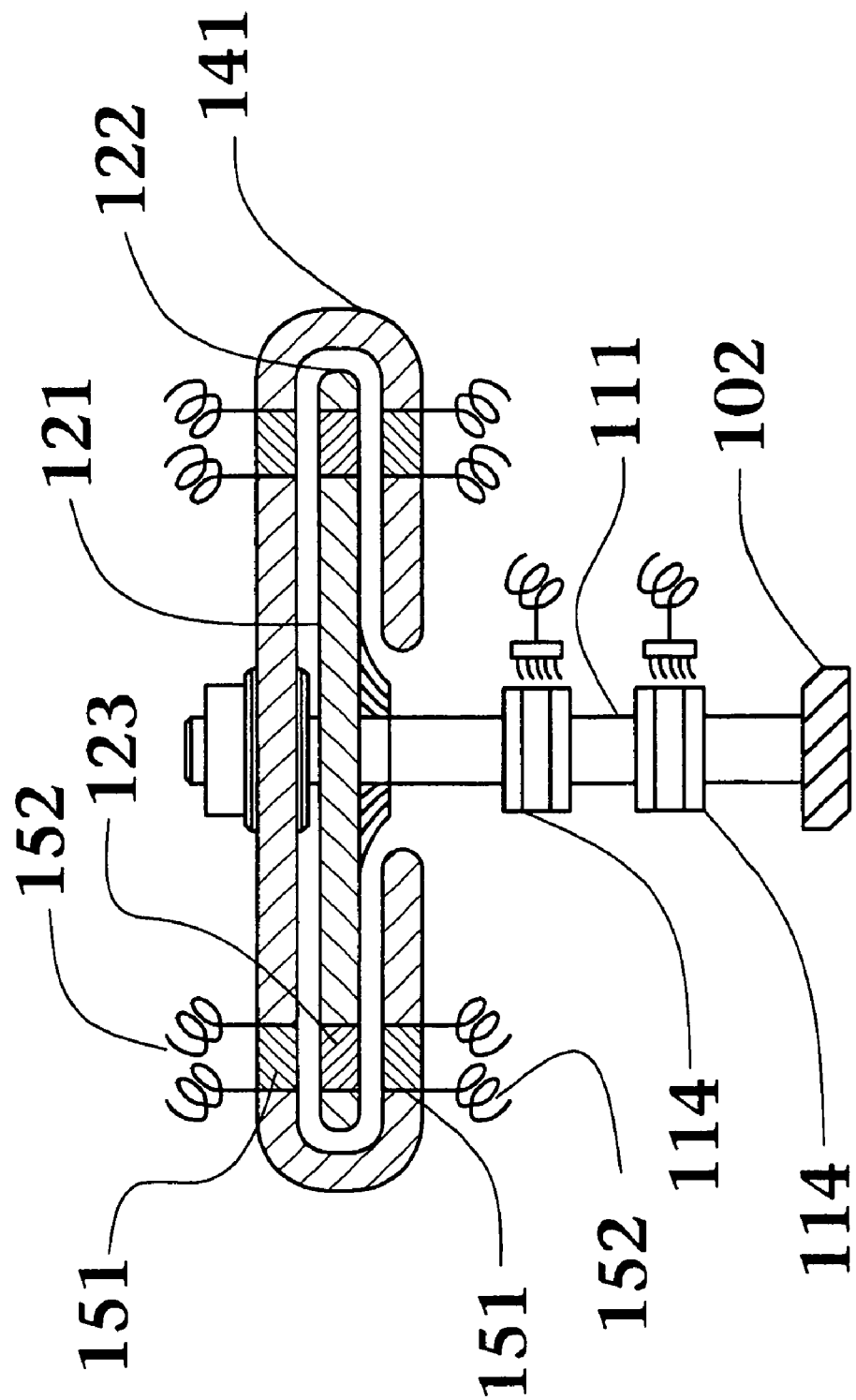
FIG. 3 depicts the cross-section of the upper portion of the shaft (111) from the side further depicting a stator and the arrangement of electromagnets with cut out section revealing rotor housed within and permanent magnets on disk rotor.

Making reference now in FIG. 3 it is helpful to examine the cross-section of the upper portion of the shaft (111) from the side and the relationship between the stator (141) and the disk rotor (121). It can be seen that electromagnets (151) are housed both above and below the outer edge (122) of the disk rotor (121). Mounted at this point near the outer edge (122) of the disk rotor (121) may be one or more permanent magnets (123). Electromagnets (151) are, by conductors (152) in electrical communication with a power supply (not depicted in FIG. 3). FIG. 3 also depicts to independent DC generators (114) and the inductive cooling fan (112). It further depicts the transmission member (102) and the bearing joint (132).

Figure 4:
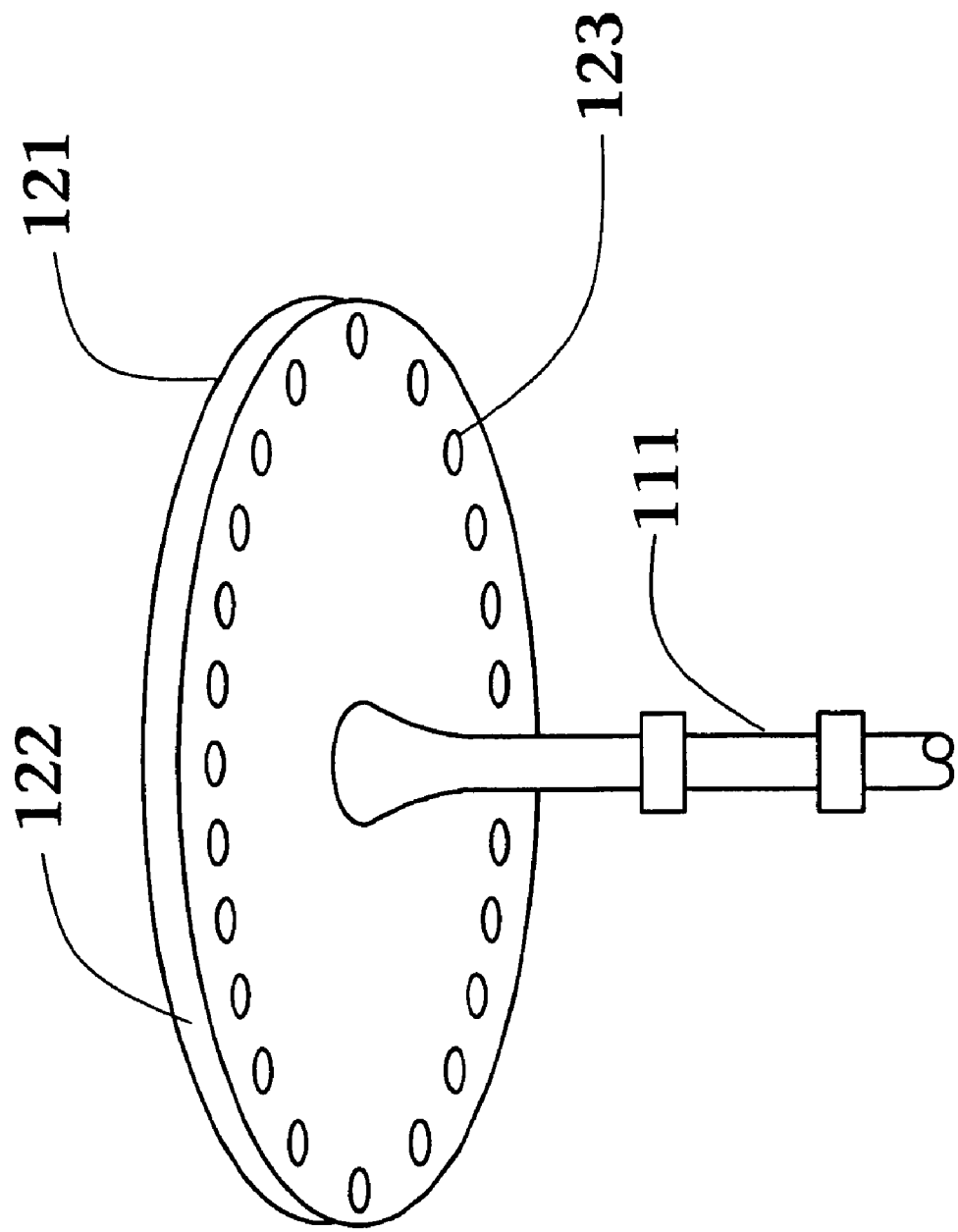
FIG. 4 depicts, in isolation, a disk rotor which is integral with a shaft.

FIG. 4 depicts, in isolation, a disk rotor (121) which is integral with a shaft (111). This also shows that the permanent magnets (123) are regularly positioned along or near the outer edge (122) of the disk rotor (121). As will be described in greater detail later, the angular orientation of the permanent magnets (123) may be adjusted to optimize the operation of the apparatus.

Figure 5:
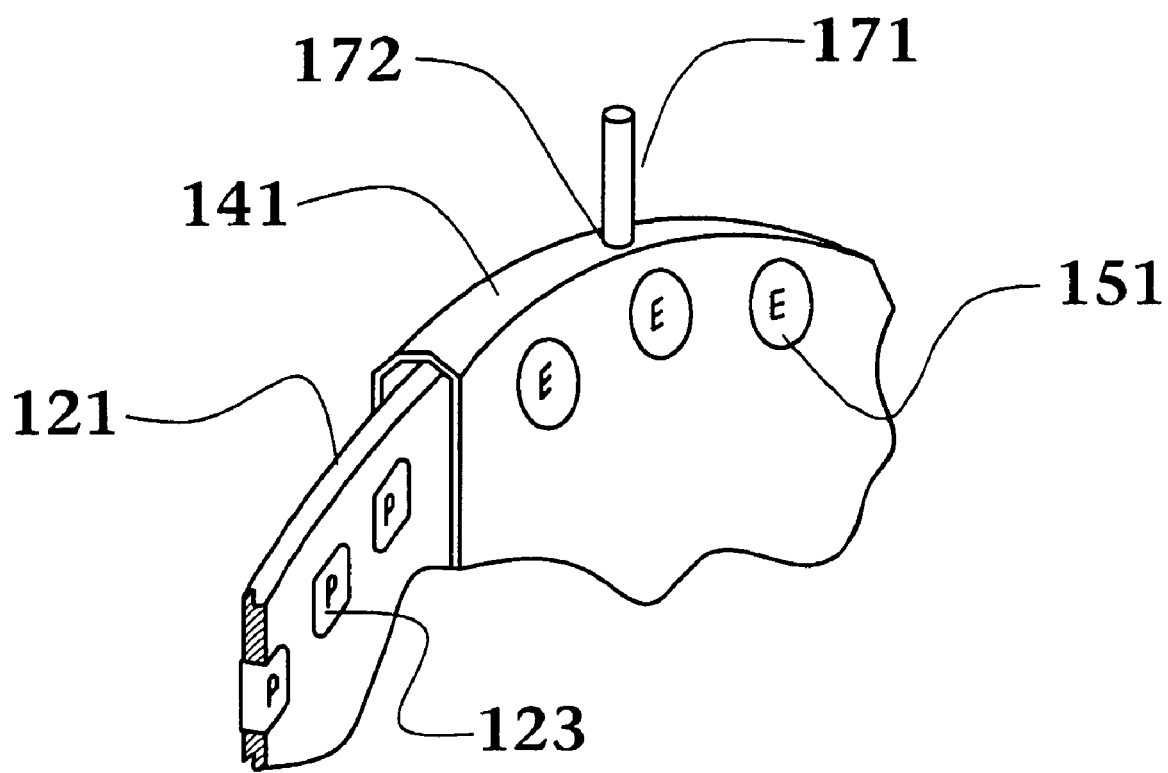
FIG. 5 depicts an oblique view of the stator and disk rotor in isolation with cut out portions of the stator and the disk rotor showing electromagnets and permanent magnets arranged with regular spacing.

Making reference now to FIG. 5, an oblique view with cut out portions of the stator (141) and the disk rotor (121) shows that the electromagnets (151) and permanent magnets (153) may both be arranged with regular spacing on the stator (141) and disk rotor (121) respectively. As with the permanent magnets (123) and as will be described in greater detail later, the angular orientation of the electromagnets (151) may also be adjusted to optimize the operation of the apparatus.

Also along the stator may be a sensor (171) which is used to measure and signal to the CPU (150) information regarding the positioning of the rotor (121) and the rate of rotation of the rotor (121). Such sensor (171) may, but need not, comprise a laser (172) which "looks for" a particular point or feature (126) of the rotor (121) in order to establish the relative relationship between each of the electromagnets (151) and each of the permanent magnets (123). This is possible because, as will be pointed out in more detail below, the CPU (150) will have a ROM within which is etched a precise description of the rotor (121) used for any application of the apparatus. In practice, the positioning sensor (171) may use any method to define the positioning and any other number or variety of sensors may be used to measure and signal any variety of parameters of operation of the device or useful information concerning the ecosystem or environment of the apparatus.

Figure 6A:
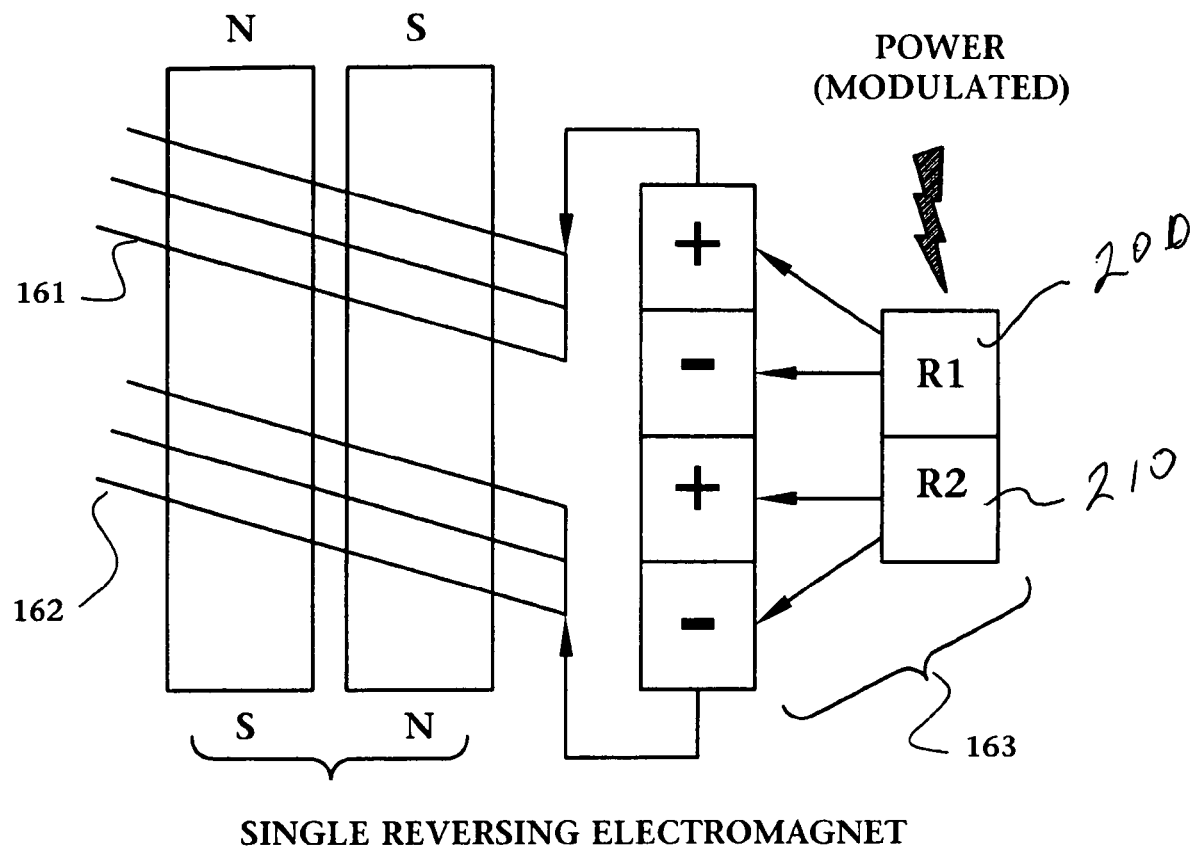
FIG. 6A depicts a reversing electromagnet with an attractive electromotive force supply and a repelling electromotive force supply as described in the preferred embodiment of the present invention.
Figure 6B:
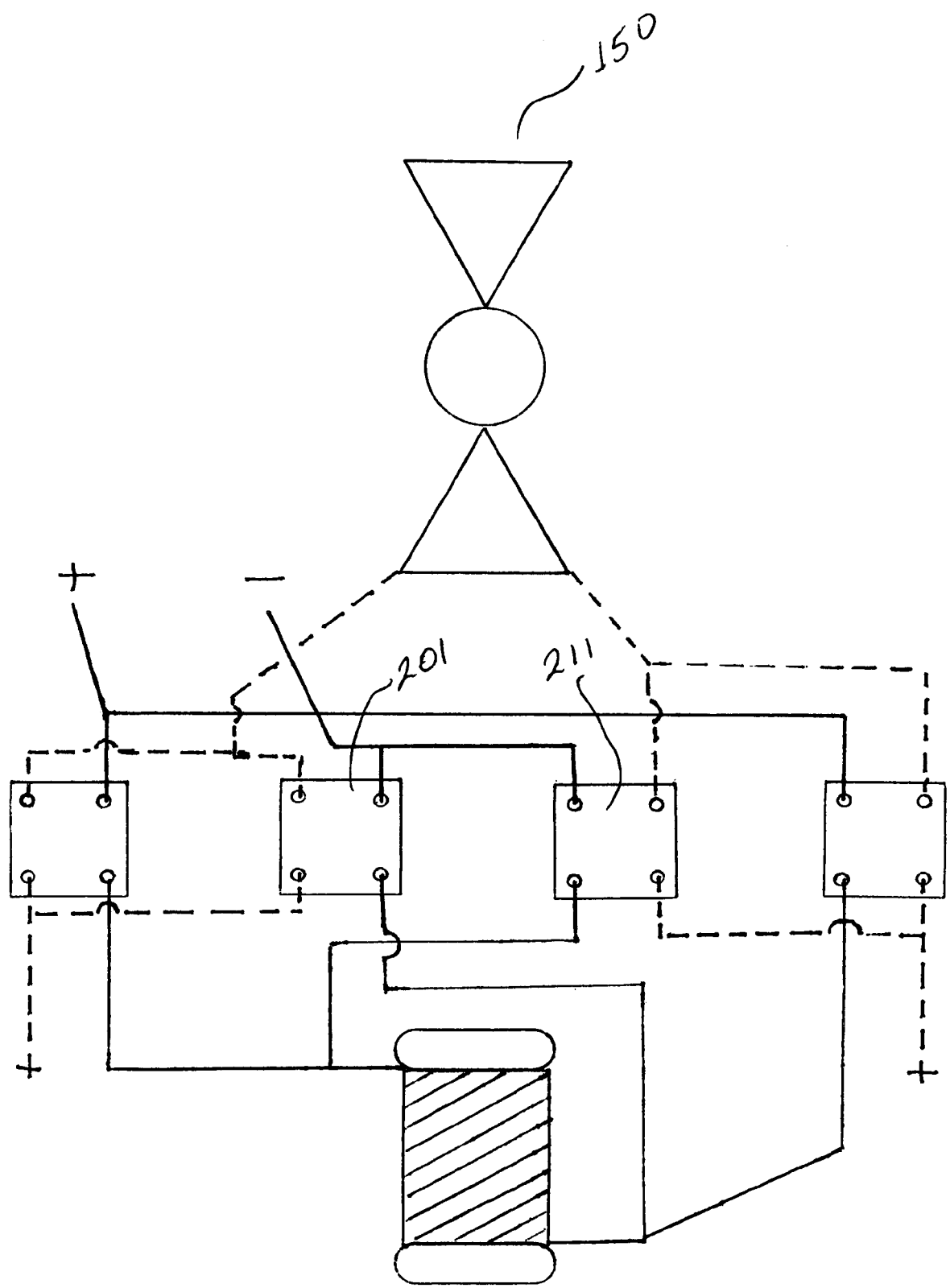
FIG. 6B depicts the electromotive force attract and repel circuits, each further adapted with electron blocking switches.

Making reference now to FIG. 6, it can further be seen that they may, but need not, be double-wound with electromagnetic coils (161, 162) adapted to be alternatively energized by a modulated power supply (represented by 163) to produce opposite magnetic field orientations. While the modulated power supply (163) is depicted in FIG. 5 for the purpose of demonstrating the nature of the double-wound electromagnetic coils (161, 162), in practice the power supply for the electromagnetic coils (161, 162) would be supplied by the power supply depicted as (142) in FIG. 2 and would be modulated by the CPU (150). Table 1 depicts an example of how such reversing electromagnets may be easily controlled by a logic circuit. As an alternative to double-wound coils, for instance, separate electromagnetic coils could be adapted for opposite magnetic polarity.

It is useful here to point out that, while the preferred embodiment has been described with respect to a stator which houses electromagnets (151) both above and below the permanent magnets (123), the only matter of real importance to the operation of the apparatus is that the electromagnets and permanent magnets be sufficiently proximate to each other and that the CPU ROM is aware of the proximity so that this factor will be properly considered in the logic circuitry which will regulate the apparatus. This will be described in more detail later in this description.

Making reference to FIG. 6A it can be seen that each of the electromagnetic coils are adapted with and attract circuit (201) and a repel circuit (210). Such circuits are designed to ensure that the electromagnetic field interacts with the magnetic field of the permanent magnet to create an attracting force when each permanent magnet approaches the next electromagnetic coils (161,162) and, after passing each electromagnetic coils (161, 162), the electromagnetic field will be reversed to push the permanent magnet (123) along to the next electromagnetic coils (161,162).

The inventors have discovered, however, that if both the attract circuit (200) and the repel circuit (210) are further adapted with relays (201,211) which can be used to effectively turn off the attractive and repelling currents from the coil that electrons will remain "trapped" within the coil and not escape, which requires additional electromotive force to replace them within the coils (161,162).

The output measurement of the apparatus are shown in Tables 4 and 5. Table 4 depicts the output of the apparatus without the rapping relays (201,211) which may be used to trap the electrons within the coil. It can be seen that there is a rapid reduction in output at the time that the electromotive force applied to the electromagnetic coil is turned off what the circuit left closed. In the same graph it can be seen that, in the next cycle, time is required to return the output to its peak. This represents the electromotive force required to restore the current to the electromagnetic in order to achieve the required electromagnetic field.

Making reference now to FIG. 5 it can be seen that the output of the apparatus approaches the pattern of a square wave. The energy and efficiency lost without the trapping relays (201,211) represented by the energy necessary to first build the output up to peak and which is then dissipated with the escaping electrons is recovered as the electromotive force is only required to oscillate the electrons back and forth within each of the electromagnetic coils.

The timing of both the application of the attracting and repelling electromotive forces together with the timing of the trapping relays (201,211) is a matter which is programmed into the logic circuitry of the apparatus.

It should be noted that the apparatus is both adapted and intended to be used in a variety of environments and with a variety of fabrication materials, particularly with respect to the magnetic materials. This is true both for the permanent magnet and for the electromagnetics. Such variety extends not only to the materials used with the various magnets but also extends to the shape and configuration.

For instance, the magnetic fields created and sustained by the permanent magnets will necessarily decay over time. If the apparatus is to be used in an environment or situation in which maintaining the apparatus by replacing the permanent magnet upon its decay to a certain level, it may be desirable to use a material such as blank for the permanent magnet since such material decays at a much slower rate. On the other hand, if the device will only be used in relatively short bursts of time and, be regularly maintained it may be desirable to use a ceramic permanent magnet, which may offer other advantages, such as less expensive fabrication and easier replacement.

Additionally, certain kinds of permanent magnetic materials are capable of maintaining more intense magnetic fields or, if such materials may be molded or shaped, shaped magnetic fields which may further enhance the efficiency of the magnetic field interaction between the permanent magnet and the induced electromagnetic fields.

While the apparatus is meant and intended to work with any material which may be adapted to maintain a permanent magnetic field, it can also be seen that the electromagnetic circuitry, including both the standard application of electromotive force to each electromagnetic coils as well as the trapping circuitry, can and should be adjusted to take maximum advantage of the particular interaction between permanent and electromagnetic fields.

Similarly, electromagnetic coils now are available in a variety of materials and configurations. While it is generally convenient and accurate to say the electromagnetics have a "core" it is also well-known that such "core" may be either some material, the ambient atmosphere, or a vacuum. Additionally, while it has also been traditionally understood that the electromagnetic "coils" comprised a series of current loops, it is also possible to configure a loop of current sufficient to produce an electromagnetic field without a series of current loops but with a "band" of current which may be cylindrical, triangular, or in a box configuration as long as the current travels congruously "around" the targeted space desired for electromagnetic field production.

Additionally, the relative field strengths between each of the permanent magnetic fields and each of the electromagnetic fields must be considered. Of course, it would be desirable to keep this relationship the same for each of the permanent magnetic field and electromagnetic field interactions as the device rotates. But it must also be considered that the magnetic field of each permanent magnet and the magnetic field induced within each electromagnetic will bear some relationship to each other and such must be taken into account in the timing and programming of the electromagnetic circuitry. This is because the permanent magnetic field may have the effect of creating an opposing electromotive force resulting in a tendency to drive the trapped electrons away from the coil. Accordingly, the timing of blocking this path in order to more efficiently trapped the electrons will be a function of all of the parameters of the device, including its rotational speed, the physical dimensions of the magnetic components, and the various magnetic materials and configurations used.

Figure 13:
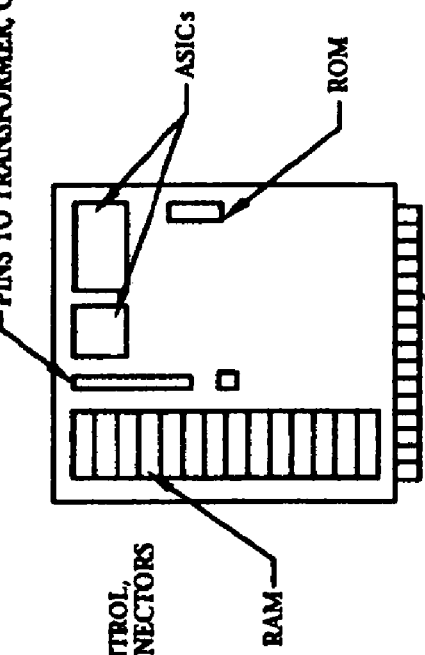
FIG. 13 depicts a block diagram of how the improvement to the present invention improves the efficiency of the apparatus.

As set forth in FIG. 13, Adding discrete proprietary closed-loop high-voltage electromagnet coil(s) circuitry and algorithmic controls is used to exploit a square wave form created by the trapped electron in the electromagnetic circuit. The circuits and control mechanisms taught herein trap electrical reflections within the electromagnetic arrays on field collapse. As each pulse is delivered to the appropriate electromagnet the delivery circuit is controlled by relays that are directed to open and close according to instructions from timing and controlling systems designed to keep the electron trapped.

These trapped electrons in effect, are already loaded to the electromagnet(s) thereby shortening voltage build-up time within the coil(s) as well as continuing to produce work rather than escaping to ground or otherwise collapsing. Repeated test results demonstrated that an input power reduction of nearly 60% permitted a constant RPM with MGE proprietary circuits switched ON as compared to maintaining the same RPM with MGE circuits switched OFF. % Reduction= (Amount of decrease/Initial value)*100

For example,
Constant RPM: 127.6 watts use with MGE circuits OFF; 51.77 watts use with MGE circuits ON. Note: Repeated testing with different RPM constants tend to demonstrate a linear expectation throughout the rpm ranges available.

DESCRIPTION

The MGE circuit works as follows. A signal from the controller is received by relay. The relay opens primary high-voltage positive/negative feeder circuit to selected electromagnet(s). Current is released to electromagnet. When electromagnetic field turn-off is commanded by the controlling algorithm, all circuits are simultaneously broken to the electromagnet by relays (201) or (211). This traps the previously loaded electrons within the electromagnet. When electromagnetic field turn-on is commanded by the controlling algorithm, both positive-negative circuits are simultaneously opened to the electromagnet.

On circuit close, all electrical pathways are terminated by the controlling algorithm with commands to relay mechanisms that immediately cut connectivity to the appropriate electromagnet. On circuit open, the previously designated negative connector is charged with positive electrons which meet and collide with the ready-to-escape electrons. The resulting collision reverses polarity and prevents the previously trapped negative electrons from escaping from the electromagnet. This reversed field influences the movement of the rotor based upon the precise moment of reversal to produce a rotating moment eventually harnessed as torque.

In addition to conserving the electricity used to energize each electromagnet by not having to reload each electromagnet every time the field collapses, the loaded electromagnet continues to influence both the rotating moment as well as to generate electrical energy by the simple movement of the permanent magnets in proximity to each previously loaded electromagnet. This energy lessens the amount of electrical energy needed to turn on the each commanded electromagnet.

Circuit isolation and electromagnetic waveforms are achieved as follows adding a switching interface to external power sources controllable via algorithmic activation contains both transformer and rectifier isolation which improves waveform consistency and energy transformation efficiency. By using electronic switching to completely isolate external power sources from energy delivery to the electromagnets square waveforms are produced rather than traditional sine waveforms. Operating the machine in a closed-loop environment increases delivery of electrons to the electromagnets for a given cycle duration.

Square waveforms enable instant on/instant off delivery of electrons across each coil's array (and individual coils) for the entire duration of the power pulse rather than the build-up typically found in conventional electric (AC/DC) motors. Delivery has been demonstrated to realize full power across the coil(s) within 4 microseconds for both attract and repel cycles.

Further, in conventional motors field collapse normally creates a large opposite polarity drain to ground of otherwise lost energy. Our technology uses circuitry to reclaim this reflective loss; reverse its polarity and reuse those otherwise escaping electrons to increase efficiency. This switching of energy supplied to the coils has demonstrated a 213% increase of useful coil energy without additional power input from an external source.

Figure 7:
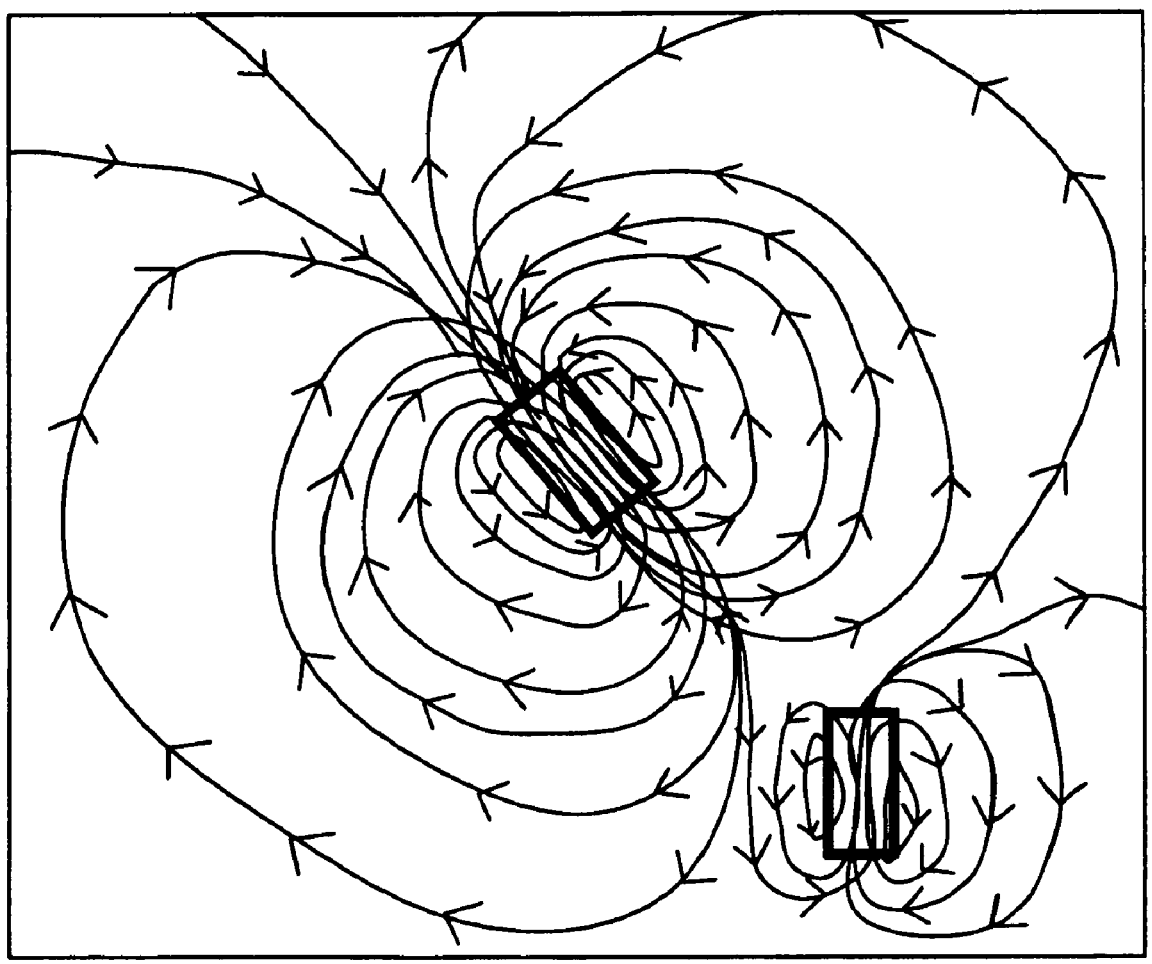
FIG. 7 depicts the magnetic field pattern desired for a permanent magnet approaching the influence of an electromagnet as the disk rotor rotates.
Figure 8:
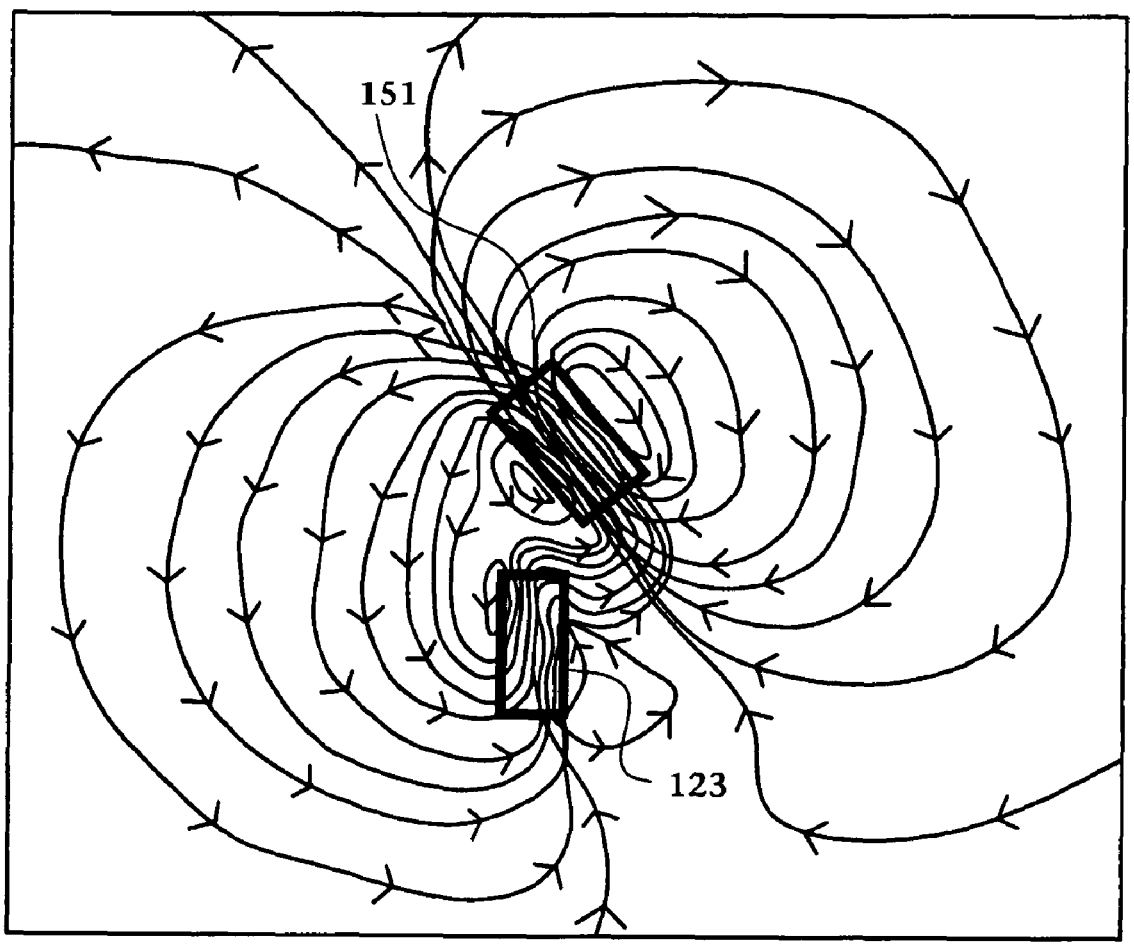
FIG. 8 depicts the magnetic field pattern desired for a permanent magnet departing the influence of an electromagnet as the disk rotor rotates.

As briefly described above, the disk rotor (121) will be propelled by the interaction between the magnetic fields of the electromagnets (151) and the permanent magnets (123). It is helpful to examine the interaction of the magnetic fields of an electromagnet (151) and a permanent magnet (123) as a permanent magnet (123) mounted upon a disk rotor (121) approaches an electromagnet (151), as depicted in FIG. 7, and then passes and leaves the electromagnet (151), as depicted in FIG. 8. FIGS. 7 and 8 depict the lines and intensity of magnetic flux as the permanent magnet (123) is first attracted, FIG. 7, and then repelled, FIG. 8, from the influencing electromagnet (151). This same pattern may be reproduced all around the circular stator (141) and disk rotor (121) array as may be determined by the CPU (150).

The efficiency and advantage of the apparatus stem from a combination of three factors. One is the selection of the engineering pattern for a given apparatus. This includes the factors such as the size of the rotor and stator, the spacing between the permanent magnets and electromagnets, and the materials used. Another factor is the selection of materials for the core of the electromagnet and for the permanent magnet. This will be described in more detail later. Finally, the programming of the CPU, which will be shown to include both a ROM and a RAM which may be adapted to achieve the optimal efficiency of the apparatus for a given application.

Figure 9:
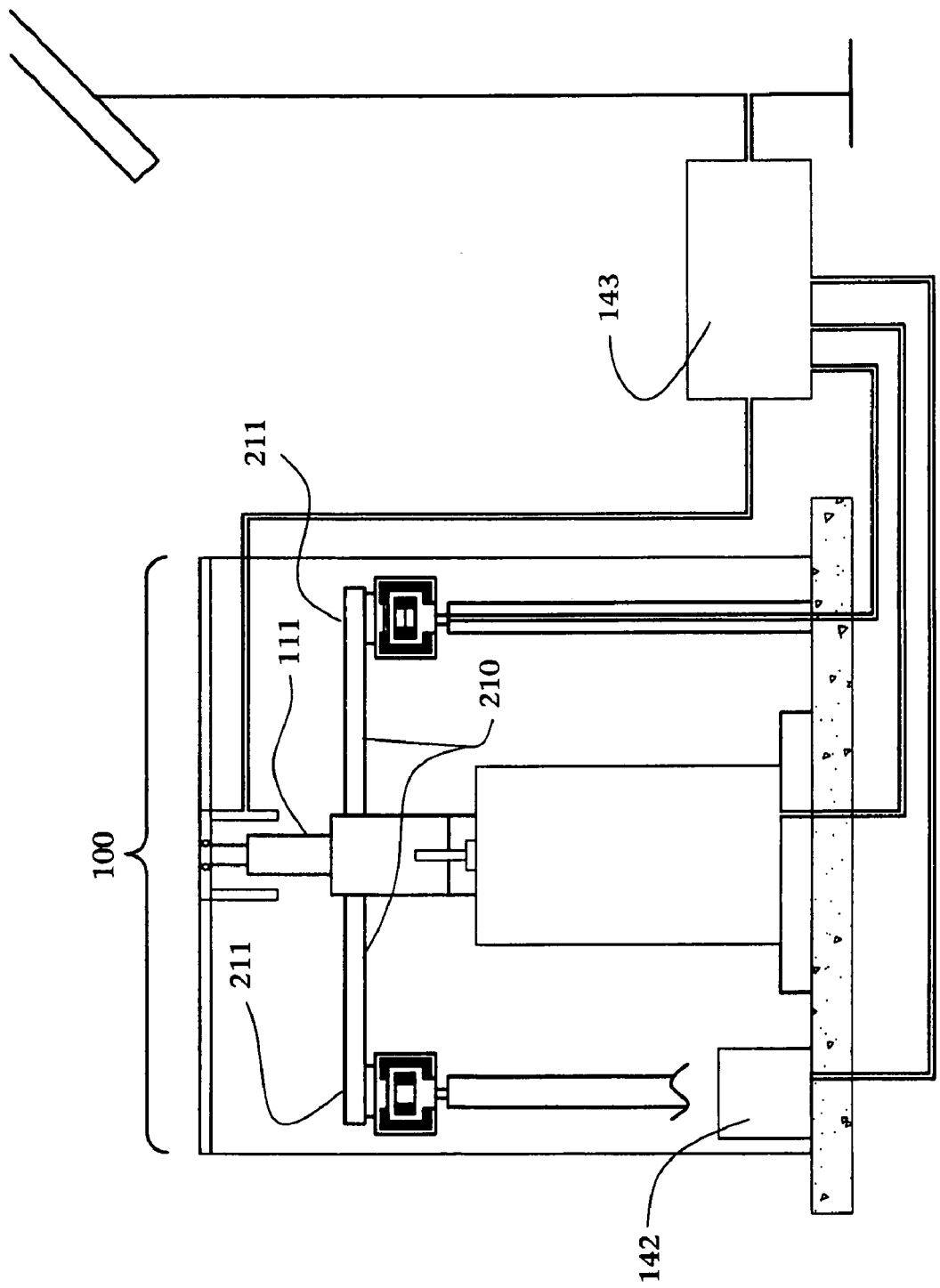
FIG. 9 depicts the side view of an alternative rotor in which the permanent magnets are mounted near the ends of rotor arms rather than a disk rotor.
Figure 10:
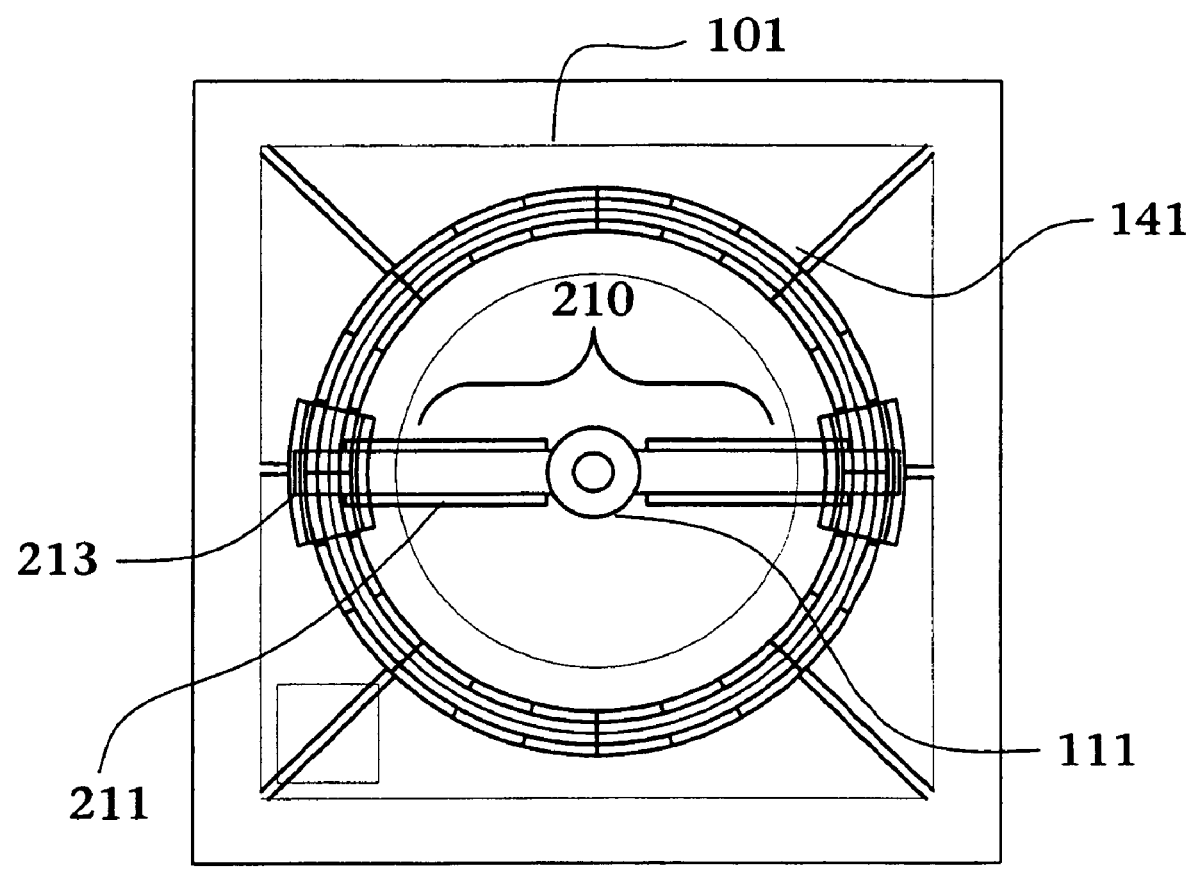
FIG. 10 depicts the top view of an alternative rotor in which the permanent magnets are mounted near the ends of rotor arms rather than a disk rotor.

It is helpful to make an observation about the physical engineering of the apparatus. The preferred embodiment has been described as a disk rotor housed generally within a stator so that electromagnets are both above and below the permanent magnets on the disk rotor. It should be noted that, as depicted from the side in FIG. 9 and from the top in FIG. 10, the rotor (210) need not be a disk but could also be one or more arms (211) extending radially out from the shaft (111) with the desired pattern of permanent magnets (213). Such a configuration may be desirable when there are limitations upon the selection of materials or when the mass of the rotor is a factor.

Figure 11:
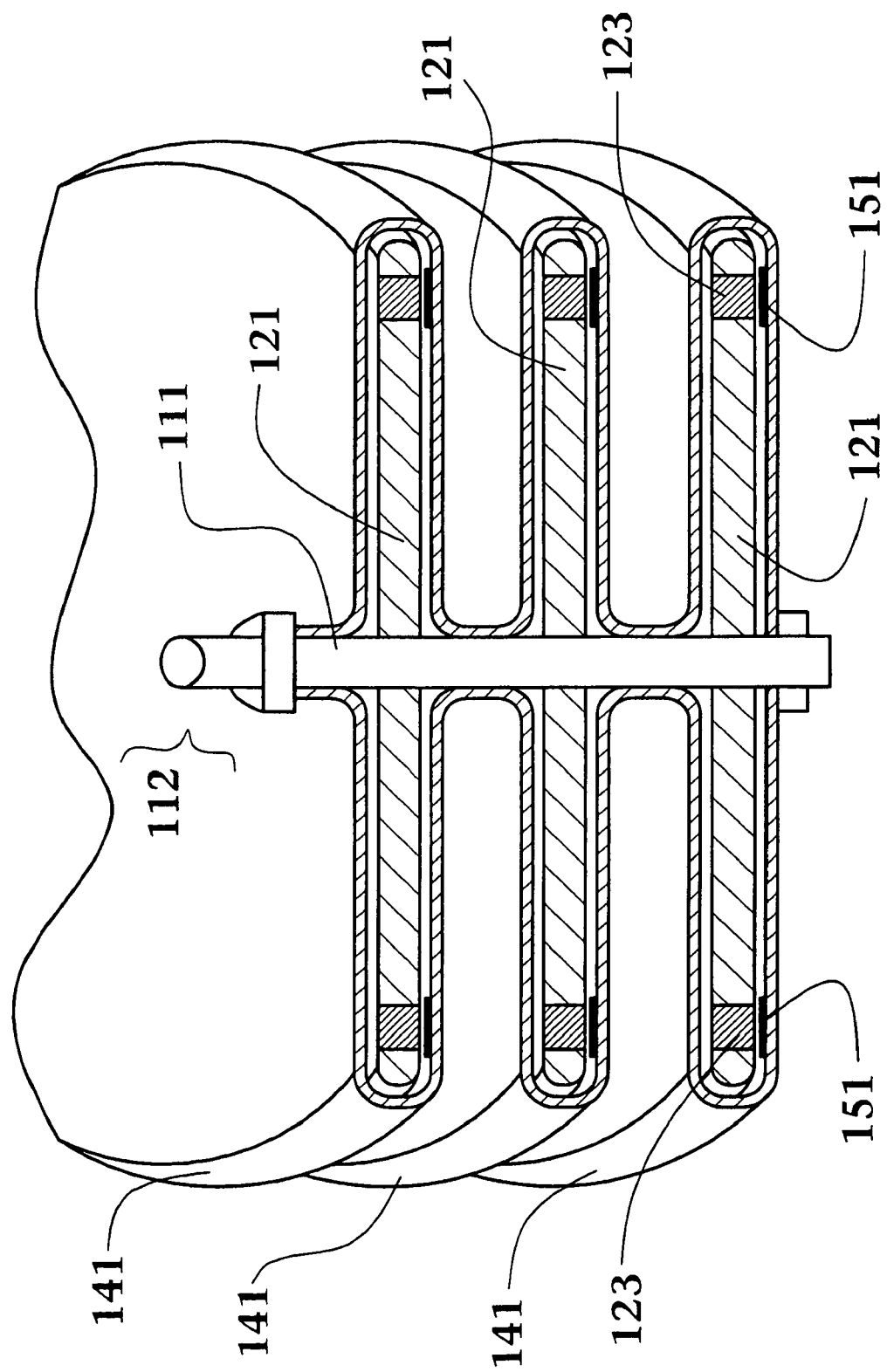
FIG. 11 depicts an alternative rotor which comprises several disk rotors.

The number of rotors used will depend upon a variety of factors. Such factors would include the spacing of the permanent magnets and the ability of the electromagnets to be manipulated so as to produce a rapidly variant magnetic field, to include even the possibility of a reversing magnetic field. This is because the more rotors which are to be used and, as well, the greater the rate of rotation of the rotors it becomes more necessary to select electromagnetic core material which will permit the more rapid variance of the in this electromagnetic field. FIG. 11 depicts how a series of rotors (214) may be combined along a single shaft (215) and housed within a series of stators (216).

Similarly, it can be envisioned (although not depicted here) that the electromagnets could be fastened by some means other than a single stator as long as they are properly positioned and secured in such positions. Moreover, even if the present embodiment is used it can be seen that electromagnets need not be positioned both above and below the rotor or may be positioned more towards the end of the rotor.

A concrete slab is depicted as the foundation or platform for the apparatus. While it may be possible to provide an adequate platform with a material other than concrete, it should also be mentioned that a stable environment is another important factor for the operation of this apparatus. Any leaning or vibration in the rotating shaft would detract from the efficient and relatively frictionless rotation of the generator shaft. One of the objects of the apparatus as designed is to avoid as much heat loss and Faraday loss as possible in order to improve efficiency. Also, as efficiency considerations become more and more sensitive, such things as temperature, the magnetic properties and dimensions of enclosure materials, ambient electromagnetic radiation, and so forth may be taken into account. This could be done by additional CPU processing or be specifically engineering an apparatus for a given environment, such as (but not at all limited to) the weightlessness of space, the heat and aridity of the desert, or the cold humidity of an arctic environment.

All of these potential alternatives should be seen as keeping within the spirit and scope of the present invention.

The materials which have been selected for this use are critical because of the need for the permanent magnet to sustain its flux density as it is repeatedly influenced by varying induced electromagnetic fields and the need for the electromagnets to be rapidly both reversed and switched on and off. Accordingly, a material which is highly resistant to any magnetic field creation at all would not be acceptable for use in the electromagnetic core according to the present invention. Similarly, a material which may create a powerful magnetic field but one which would also maintain a substantial residual magnetization from the electromagnetic current would present problems in that such would create an obstacle to the continued rotation of the rotor rather than providing it with the necessary boost to continue through the function of power generation.

For these reasons the selection of materials for both the electromagnets and the permanent magnets are a crucial feature of the present invention. Regarding the permanent magnets (151) ceramic or ferrite magnets are flexible with the magnetic powders fixed in molds for each position in the mechanism and are preferred materials for the present electro-motive machine device; although other permanent magnets are not excluded. They can be made into round bars, rectangular bars, horseshoes, rings or donuts, disks, rectangles, multi-fingered rings, and other custom shapes as appropriate for the present electro-motive machine requirements. Some may be cast into a mold and require grinding to achieve final dimensions. Others start as a powder which is pressed into a mold or pressure bonded or sintered.

Of course, there may be a variety of materials either presently known or later to be developed which can satisfy this requirement. The properties required by the electromagnetic core for the rail mounted electromagnets in the present invention are such that the material must rapidly and efficiently magnetize and be capable of equally rapid return to an equilibrium state or even a reverse magnetic polarity state when the appropriate driving current is provided.

The electromagnets for the present electro-motive machine may be constructed of alternating materials to effect different properties switched on/off by the controller computer code at exactly the right time in proximity to the rotor permanent magnets. The core of the electromagnets will be non-ferromagnetic to compensate for and eliminate residual magnetism when rapidly switched on/off. The strength and polarity of the magnetic field created by the electromagnet will be adjusted by changing the magnitude of the current flowing through the wire and by changing the direction of the current flow.

For example, a ring magnet can be magnetized where N is on the inside and S on the outside, or N is on one edge and S on the opposite edge, or N is on the top side and S on the bottom side, or multiple N and S poles all around the outside edge, etc.

The $B_x$ component of the field is uniform to +/−1% in a planar, thin volume of 2×10×0.2 mm (x, y, z) which is particularly appropriate for in-plane effects in planar samples oriented parallel to the Electromagnet surface. $B_x$ can be computer or manually controlled over the range of +/−0.4 T (4000 G) at z=2 mm from the Electromagnet surface, decreasing to a range of +/−0.1 T(1000 G) at z=12 mm. This formula will be used to alter the strength of the electromagnet arrays by varying z by computer code using last stored proximity position relative to moving permanent magnet components. The alternate wiring of the electromagnet will reverse polarity on demand as commanded by the computer code.

The magnetic flux density is proportional to the magnitude of the current flowing in the wire of the electromagnet. The polarity of the electromagnet is determined by the direction the current. The key importance of the electromagnet array characteristic is the ability to control the strength of the magnetic flux density, the polarity of the field, and the shape of the field. The strength of the magnetic flux density is controlled by the magnitude of the current flowing in the coil, the polarity of the field is determined by the direction of the current flow, and the shape of the field is determined by the shape of the iron core around which the coil is wound.

It should be noted that, as previously mentioned, it may also be possible to equip a rail with permanent magnets and to drive the rotor by providing an alternating magnetic field to electromagnets mounted upon or near the end of the rotor which travels along the rail from one permanent magnets to another. If this embodiment of the present invention were to be adopted, the ability of the electromagnetic core material would be even more subject to rigorous requirements of magnetic flux variance than in the original embodiment. Accordingly, while it is not anticipated that this would be a common embodiment of the present invention, it is here noted that the principles of the present invention could be practice with such an embodiment and, accordingly, such an embodiment should be seen as keeping within the spirit and scope of the present invention.

As will be demonstrated later in this description, the key to the success of the invention is the timing and sequencing of the rail mounted electromagnets and the ability to control and adjust the magnetic fields. While more will be provided about this process later in the course of describing this invention, it should be seen immediately that the efficient control and application of electromagnetic energy to the rotor is a critical function and that the ability to absolutely control the magnetic state of each of the electromagnets is a goal to be achieved.

For instance, the easier and more efficient it may be to magnetically energize and then magnetically de-energize and perhaps even magnetically reverse the polarity of an electromagnetic core, the more the efficient the device will operate. In a similar manner, the more efficiently the electricity can be delivered to desire to electromagnets and switched away from the cyclically idle electromagnets, the more efficient will be the use of the energy necessary to sustain the motion of the rotor.

Figure 12:
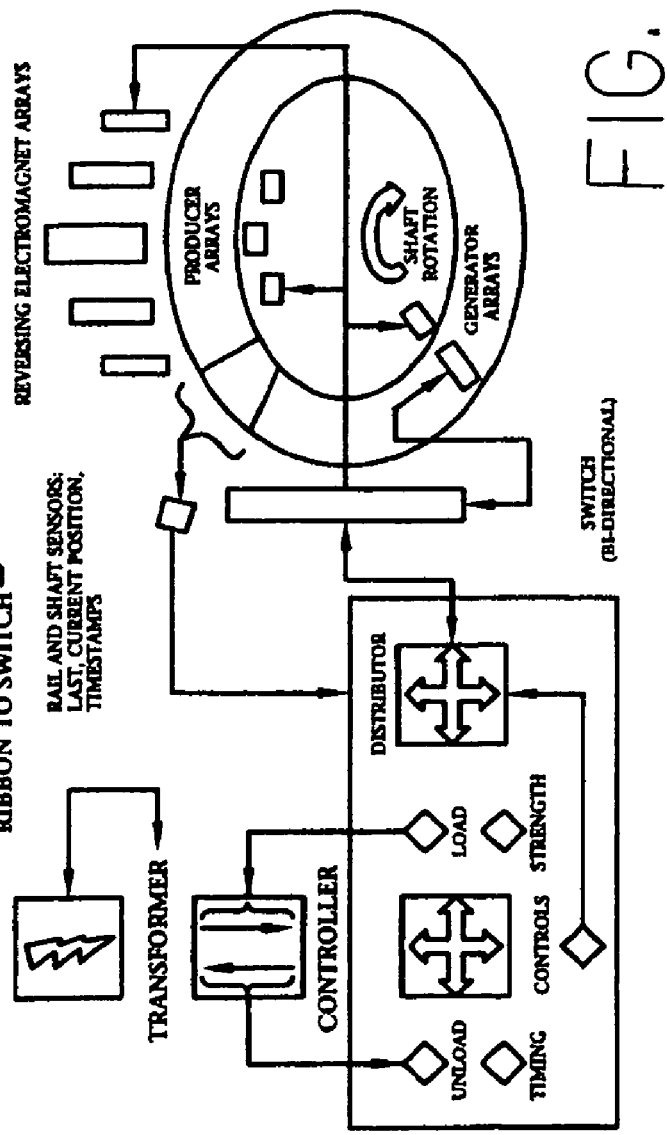
FIG. 12 depicts a block diagram of the basic Halbach array apparatus.

FIG. 12 schematically depicts the interconnection of the various electrical connections and controls. It depicts reversing electromagnetic arrays along the rail of the device with producer arrays within the power production portion of the generating unit. It further depicts the sensors along the rail and the shaft which record last and current positions of the rotor with time stamps. It can now be understood how the information is fed into the logic circuitry which, depending upon the rate of rotation, the position of the rotating permanent magnets and rotors, and the desire power output may adjust the rate and level of the electrical current to the electromagnets in order to produce the desired level of electricity.

Additionally FIG. 12 depicts the signal communications and power connections which regulate and carry the electromagnetic current from the capacitor, through the distribution box, and to the electromagnets which are presently required for engagement in schematic form.

FIG. 13 depicts one potential configuration of a circuit board which would be adequate to operate the apparatus. It includes input receptacles for receiving the required data with respect to the rotation of the generator shaft. It also includes outputs for switching the current from the capacitor to the desired electromagnets at any given point in time. The sequential timing of the electromagnet firing will likely require fine tuning and optimization for each combination of electromagnetic cores, operating speeds, and power outputs desire. This is because optimal timing will be based upon the magnetic properties of each electromagnet configuration and the configuration of the electric field in each rail mounted track.

For instance, depending upon the surroundings of each rail, a different shape of magnetic field may exist. Some of these electric fields may not warrant supplying an electromagnetic force until a rotor mounted permanent magnets is very near the target electromagnet whereas other electric field whereas other electromagnetic configurations may result in measurable field strength in more distant locations from the target electromagnet thereby justifying the application of a longer electromagnetic pulse.

The theme of the invention is in creating an enhanced efficiency of the use of a Halbach magnetic array to drive the rotation of the generator of a rotor and to permit its rotation to be sustained by bleeding off only a small portion of the rotational energy generated by the electromotive machine. This is accomplished by making more effective use of the residual magnetism of permanent magnets and by engineering a framework for rotation which is highly efficient and stable. Most significantly, however, this is achieved by the carefully calculated application of current to electromagnets at the precise time and through the precise range of rotation to produce a steady rotation while using only a small amount of electrical energy.

It is, then, important to understand the function and operation of the controlling logic circuitry. This new electric-motive machine uses computer code etched in proprietary computer chips (ROM) that provide switching instructions to activate/deactivate the reversing electromagnets (151) as the disk rotor (121) and permanent magnets (123) rotate within the stator (141). Each configuration of the apparatus will need to be programmed and tuned to achieve maximum efficiency.

In order to optimize the operation of the apparatus, the CPU (150) includes a ROM, which comprises a chip into which the generally non-variable parameters of the device are etched. These might include the size of the rotor and stator, the spacing patterns of the permanent and electromagnets, and other such information. Table 2 depicts what may be on the ROM. Table 3 depicts the measurements taken by the sensors of the apparatus which are available in the CPU RAM. Table 6 depicts a series of programming commands which may be useful in controlling the operation of an electro-motive machine utilized as a power generator as described in the preferred embodiment of the present invention.

This algorithm (Table 6) governs the flow, strength, selection, and polarity of the electromagnets located in the outer rail (stator ring) in which the rotor permanent magnets interact. As each rotation is completed, the computer code will check environmental variables to gain permission for another cycle. Depending on output and/or throttle controls/limitations, the cycle can be accelerated or slowed by changing the speed, electromagnet strength, and duration variables with an interface that overwrites selected RAM values.

Other computer logic devices may be incorporated to perform ecosystem controls such as environment temperature limits, input/output conditioning, device controls such as throttle, use specific characterization, etc. These could include, but are not limited to, the following additional controls: vary electromagnetic strength using environmental limits; distribute current to electromagnet switching device; provide monitors and alarms; control capacitor load/unload sequence; control battery charging sequence, strength, duration; maintain device state: device maps, and component status; perform logical expressions influenced by external input; and other functions as necessary.

It can be seen that each such additional ecosystem adjustment capability offers an opportunity to further enhance the efficiency of the device and it should also be seen that the device would not even need such controls or measurements if operated under conditions where they were not necessary, such as when the device has been engineered to a particular and stable ecosystem. These and others may be added or deleted to suit the needs of any given configuration of the apparatus and each combination, from no ecosystem measurements or controls to a combination of as many as can be imagined should be seen as in keeping within the spirit and scope of the present invention.

Based on empirical data from prior research such as that performed for the Halbach Electric Machine; the present invention may improve efficiency and energy conversions in any one or combination of the following areas:

Hermetically sealed electro-motive machine housing eliminates dust, particles, and other external conditions (humidity, etc.) from increasing moving part friction. The electro-motive machine housing may be evacuated and filled with insert gas such as Nitrogen to further reduce friction;

Use of sealed bearings with synthetic lubrication oils supporting a wide temperature range allows less susceptibility to metal fatigue thereby increase operating life and reduce friction;

Certain load-carrying bearings may be suspended magnetically to further reduce friction;

Use of ceramic materials for electro-magnetic components and stator housing components eliminates residual magnetic flux interference as well as assist device cooling;

Ceramic material or cast aluminum construction for primary housings allow shaped magnetic flux patterns to be created and then stabilized for maximum efficiencies without casing and structure interference. Shaped fields and flux patterns for both stator and rotor components are then optimized for maximum pull, push, and free rotation;

Stabilized shaped field intensity and duration are adjusted by computer to further increase efficiencies based on stator/rotor position measurements and throttle control commands;

Use of aluminum and titanium composites for rotor, permanent magnet mounts, and other non-ferrous materials for rotor shaft increase field efficiencies and reduce rotational flux interference;

Incorporation of molded fan blades as a part of the rotor operating within a hermetically sealed environment reduces need for external cooling mechanisms.

Energy conversion efficiencies are improved by filling the hermetically sealed electro-motive machine housing with an inert gas less able to break down by temperature rise;

Use of capacitors to store electricity produced by the electro-motive machine generating components to re-supply electro-magnets activation increases battery life thereby increasing time before battery replacement;

Use of a dry/wet charged cell battery to provide starting energy and computer controlled electro-magnet sequential activation lessens dependence on electrical charging components;

Battery replenishment circuits connected to transformers connected to standard shaft or gear driven generators improve battery life and machine operating cycle life;

Use of gold plated or gold composite contacts for electrical paths reduces latency, electric path resistance, and improves current flow efficiency;

Using solid-state switching computer code reduces latency of current switching to electro-magnets and improves ability to meter electro-magnet strength, flux density, and permeability thereby increasing efficiency and longevity of electromagnetic materials while providing instant on/off and throttle capability;

Use of geared shaft output for external generating components and motive power provides dual purpose and taps stored kinetic energy from rotating parts to assist efficiency under load;

Use of narrow commutating rings and high-density (gold or other highly conductive material) brushes with separate permanent magnets for internal electricity generation routed to capacitor and transformers battery charging circuits improves closed-loop characteristics;

Use of capacitors, transformers, solid-state switching controlled by computer-code to route pre-determined current voltage, amperage, and wattage to appropriate devices using calculated timing based on rotor/stator relationships improves efficiency beyond any known configuration of Halbach or other magnetic electric machines;

Measured location installation and sizing of each stator electro-magnet provides static positioning information that is used to calculate polarity, on/off, and power to the electromagnets thereby insuring that only the most forceful and directional part of the repel/attract magnetic flux interaction with permanent magnets is used to move the rotor. Generally, this is determined to be from 38 to 47 degrees off North/South axis but this may vary from this range depending upon the particular apparatus and materials used.

An example of the operational efficiency of the device is provided herewith in Table 5. It should be noted that this is the result predicted for just one of many potential embodiments of the apparatus all of which should be seen as keeping within the spirit and scope of the present invention.

A basic electro-motive machine could be constructed using the following components:

1. alternating current generator
2. rotor shaft with disc at one end
3. bearings to hold rotor in a position perpendicular to the circular rail
4. relays to switch current into and out of the capacitors
5. multi-position switch with single current input and multi-port outputs
6. capacitors to store/discharge generated electricity
7. wet or dry cell battery
8. ceramic core electro-magnets with dual windings that reverse polarity
9. Permanent alnico magnets embedded on the rotor disc perimeter.
10. A housing that contains a circular rail with embedded electro-magnets paced equal distance around the perimeter with two perpendicular holes containing the rotor shaft bearings.
11. a measurement table of distance between each electro-magnet.
12. a measurement table of distance between each permanent magnet on rotor.
13. photo-cell or laser sensor to determine rotor/stator position relationship.
14. wiring to enable redirecting current to each electro-magnet from the multi-output switch.
15. wiring that activates electro-magnets with polarity in one direction and duplicate wiring that activates the same electro-magnets with polarity in the opposite direction.
16. commutating ring with brushes to receive generated current from the conventional generator.
17. transformers to alter voltage and alternating current into direct current.
18. wiring from the generator brushes to transformers.

19. wiring from the transformers to a regulator to charge the battery.

20. a gear on the output shaft of the rotor to obtain motive force.

21. a calculator to compute interval, polarity, and voltage required by each electro-magnet approaching the rotor based on current rotor position, rotor permanent magnet location, rotor rotation speed, rotor rotation direction, and last known rotor position, last known rotor rotation speed, last known rotor rotation direction, last known electro-magnet position proximity, last known electro-magnet position proximity identification, last known electro-magnet position proximity identification polarity, last know electro-magnet position proximity identification strength.

22. a mechanical means to start rotor rotation, either hand crank or externally power starter motor geared to rotate rotor one complete 360 degree rotation; and 23. non-ferrous materials to construct casing, rotor shaft mounts, frame and housings.

It is worth mentioning that even such matters as the reversal of magnetic arrays (placing permanent magnets on the stator and electromagnets on the rotor) could be accomplished without departing from the spirit and scope of the present invention, although this particular alternative might complicate the task of supplying energy to the electromagnets.

It should also be readily seen that a variety of substitutions are available for these components and that these components may also be satisfied and further augmented by a variety of available devices. All of these alternative component selections should be seen as keeping within the spirit and scope of the present invention. Such alternatives extend to not only the various material and engineering alternatives that have been mentioned, but also the variations in such things as the operational parameters which are measured and factored into the operation of the apparatus by means of the logic circuitry. Moreover, all of the various applications for the apparatus should be seen as included by this disclosure, both those which have been specifically mentioned as well as those which may be obvious from this description.

Any device in which the described or similar radial magnetic arrays are used and exploited by carefully selecting materials and operating sequences to achieve maximum efficiency in developing radial energy should be seen as so included as well.

The apparatus further describes the use of electrical circuitry which is well known and need not be further described or depicted herein. Such includes the use of relays, switched, brushes, coils, and so on to accomplish well-known electrical tasks and objectives. Each of these should also be seen as keeping within the spirit and scope of the present invention.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. Apparatus for generating rotational energy by means of manipulation of magnetic fields, the apparatus comprising:
    a rotational energy generator in which a central shaft is integrally joined with one or more rotors, each said rotor having, at or near its most distant radial points, a permanent magnet array, said permanent magnet array comprising one or more mounted permanent magnets adapted to maintain and radiate a steady magnetic field following repeated exposure to alternating magnetic fields, said permanent magnet array further adapted to travel radially within a circular track housed within a stator, said rotational energy generator further being adapted with transmission means for output rotational energy power to be delivered to a target consumptive facility;
    said circular track being adapted to provide housing and electrical communication for an electromagnet array, said electromagnet array comprising one or more electromagnets which may be regularly spaced so as to be proximate to the permanent magnets of said permanent magnet array as it rotates about said shaft and radially about said track;
    each said electromagnet being adapted to generate an electromagnetic field when supplied with a desired electromotive force, each said electromagnet being further adapted with material and dimensions so as to permit said electromagnetic field to be rapidly developed, sustained and to provide a magnetic flux created when an electric motive force is applied, and then to rapidly lose said magnetic flux when said electric motive force is switched off from said electromagnet, and to further be capable of rapidly reversing said magnetic flux orientation when said electric motive force is reversed through said inductive coil or passed through an alternative reversing electromagnet;
    each said electromagnet being in electrical communication with a power supply, said power supply further comprising an electrical storage component capable of storing and releasing small bursts of electrical current as may be directed from one or more switches, said power supply being selected from any component known to have the capability of reliably storing and releasing said electrical energy in small and precise bursts, said power supply further being adapted to receive electrical energy in small amounts and to reliably and efficiently store said electrical energy for release, and said power supply further adapted to receive and transform said power from said power generator output for any other desirable source into a proper form for power supply storage, said electrical communication being further adapted with at least one relay within each electrical side of the connection between the electromagnetic coil of each said electromagnet and said power supply so that said relays can be closed to permit electrical current to flow through said electromagnetic coil or opened to prevent the flow of electrical energy from said electromagnetic coil; and
    controlling means for managing and controlling the storage, trapping, and release of electrical energy to achieve optimal timing and quantity of the delivery, trapping, and reversing of electrons from said power supply to each said circumferential electromagnet, said controlling means further comprising sensors detecting and communicating the rate of rotation of said generator shaft, the position of each said permanent magnet, and any other data useful in determining the optimal times for delivery, trapping, and release of said bursts of electrons and the amount of electromotive force to be applied to produce each said burst of electric current, receivers to receive input signals from said sensors, and relays and switches adapted to facilitate said current release.

2. The rotational energy generating apparatus described in claim 1 in which each said permanent magnet is made of a material suitable for accepting and storing a permanent magnetic field with a substantially predictable rate of decay.

3. The rotational energy generating apparatus described in claim 1 in which said power supply further comprises one or more combination of capacitors adapted to receive and store small increments of electricity and release electrical energy in precise bursts of current as directed by a source of controlling logic.

4. The rotational energy generating apparatus described in claim 1 in which said power supply further comprises one or more combination of capacitors adapted to receive, store, and capture small increments of electricity and release electrical energy in precise bursts of current as directed by said control means.

5. The rotational energy generating apparatus described in claim 2 in which said power supply further comprises one or more combination of capacitors adapted to receive, store, and capture small increments of electricity and release electrical energy in precise bursts of current as directed by said control means.

6. The rotational energy generating apparatus described in claim 1 in which said controlling means further comprises a CPU, said CPU further comprising a computer ROM within which is stored permanent or non-variable dimensional parameters of the rotor and the positions of said permanent and electromagnetic arrays;
- said CPU further comprising a computer RAM with input means by which the data retrieved from said sensors may be received by said RAM,
- logic means by which said data may be interpreted used to determine the rates at which said electromagnets should be energized, blocked, and de-energized; and
- control means by which said electromagnets may be energized, blocked, and de-energized as necessary for the effective operation of the radial energy generating apparatus.

7. The rotational energy generating apparatus described in claim 2 in which said controlling means further comprises a CPU, said CPU further comprising a computer ROM within which is stored permanent or non-variable dimensional parameters of the rotor and of said permanent and electromagnetic arrays;
- said CPU further comprising a computer RAM with input means by which the data retrieved from said sensors may be received by said RAM,
- logic means by which said data may be interpreted used to determine the rates at which said electromagnets should be energized, blocked, and de-energized; and
- control means by which said electromagnets may be energized, blocked, and de-energized as necessary for the effective operation of the radial energy generating apparatus.

8. The rotational energy generating apparatus described in claim 3 in which said controlling means further comprises a CPU, said CPU further comprising a computer ROM within which is stored permanent or non-variable dimensional parameters of the rotor and of said permanent and electromagnetic arrays;
- said CPU further comprising a computer RAM with input means by which the data retrieved from said logic means by which said data may be interpreted used to determine the rates at which said electromagnets should be energized, blocked, and de-energized; and
- control means by which said electromagnets may be energized, blocked, and de-energized as necessary for the effective operation of the radial energy generating apparatus.

9. The rotational energy generating apparatus described in claim 4 in which said controlling means further comprises a CPU, said CPU further comprising a computer ROM within which is stored permanent or non-variable dimensional parameters of the rotor and of said permanent and electromagnetic arrays;
- said CPU further comprising a computer RAM with input means by which the data retrieved from said sensors may be received by said RAM,
- logic means by which said data may be interpreted used to determine the rates and levels at which said electromagnets should be energized, blocked, and de-energized; and
- control means by which said electromagnets may be energized, blocked, and de-energized as necessary for the effective operation of the radial energy generating apparatus.

10. The rotational energy generating apparatus described in claim 5 which is further adapted with sensors for measuring variable ecosystem factors and in which said CPU RAM is adapted to receive and process said ecosystem factors in the process of determining the rates and levels at which said electromagnets should be energized, blocked, and de-energized; and
- control means by which said electromagnets may be energized, blocked, and de-energized as necessary for the effective operation of the radial energy generating apparatus.

11. The rotational energy generating apparatus described in claim 6 which is further adapted with sensors for measuring variable ecosystem factors and in which said CPU RAM is adapted to receive and process said ecosystem factors in the process of determining the rates and levels at which said electromagnets should be energized, blocked, and de-energized; and
- control means by which said electromagnets may be energized, blocked, and de-energized as necessary for the effective operation of the radial energy generating apparatus.

12. The rotational energy generating apparatus described in claim 7 which is further adapted with sensors for measuring variable ecosystem factors and in which said CPU RAM is adapted to receive and process said ecosystem factors in the process of determining the rates and levels at which said electromagnets should be energized, blocked, and de-energized; and
- control means by which said electromagnets may be energized, blocked, and de-energized as necessary for the effective operation of the radial energy generating apparatus.

13. The rotational energy generating apparatus described in claim 8 which is further adapted with sensors for measuring variable ecosystem factors and in which said CPU RAM is adapted to receive and process said ecosystem factors in the process of determining the rates and levels at which said electromagnets should be energized, blocked, and de-energized; and
- control means by which said electromagnets may be energized, blocked, and de-energized as necessary for the effective operation of the radial energy generating apparatus.

14. The rotational energy generating apparatus described in claim 1 in which said rotor further comprises a disk which is mounted integrally upon said shaft with said shaft at the rotational center of said disk rotor and in which said permanent magnets are positioned upon said disk rotor with radial regularity about the disk rotor at its most distal points.

15. The rotational energy generating apparatus described in claim 2 in which said rotor further comprises a disk which is mounted integrally upon said shaft with said shaft at the rotational center of said disk rotor and in which said permanent magnets are positioned upon said disk rotor with radial regularity about the disk rotor at its most distal points.

16. The rotational energy generating apparatus described in claim 3 in which said rotor further comprises a disk which is mounted integrally upon said shaft with said shaft at the rotational center of said disk rotor and in which said permanent magnets are positioned upon said disk rotor with radial regularity about the disk rotor at its most distal points.

17. The rotational energy generating apparatus described in claim 4 in which said rotor further comprises a disk which is mounted integrally upon said shaft with said shaft at the rotational center of said disk rotor and in which said permanent magnets are positioned upon said disk rotor with radial regularity about the disk rotor at its most distal points.

18. Apparatus for generating rotational energy by means of manipulation of magnetic fields, the apparatus comprising:

a rotational energy generator in which a central shaft is integrally joined with one or more rotors, each said rotor having, at or near its most distant radial points, an electromagnetic array, said electromagnetic array comprising one or more mounted electromagnets, said electromagnetic array further adapted to travel radially within a circular track housed within a stator, said rotational energy generator further being adapted with transmission means for output rotational energy power to be delivered to a target consumptive facility;

said circular track being adapted to provide housing and electrical communication for a permanent magnet array, said permanent magnet array comprising one or more permanent magnets of sufficient quality to establish, maintain and radiate a steady magnetic field following repeated exposure to alternating magnetic fields which may be regularly spaced so as to be proximate to the electromagnets of said electromagnetic array as it rotates about said shaft and radially about said track;

each said electromagnet being adapted with an electromagnetic core, each said electromagnetic core being further adapted with material and dimensions so as to permit said electromagnetic core to rapidly develop, sustain and enhance a magnetic flux created when an electric current is passed through an inductive coil about said electromagnetic core, and then to rapidly lose said magnetic flux when said electric current is switched off from said inductive coil, and to further be capable of rapidly reversing said magnetic flux orientation when said electric current is reversed through said inductive coil or passed through an alternative reversing electric coil;

each said electromagnet being in electrical communication with a power supply, said power supply further comprising an electrical storage component capable of storing and releasing small bursts of electrical current as may be directed from one or more switches, said power supply being selected from any component known to have the capability of reliably storing and releasing said electrical energy in small and precise bursts, said power supply further being adapted to receive electrical energy in small amounts and to reliably and efficiently store said electrical energy for release, and said power supply further adapted to receive and transform said power from said power generator output for any other desirable source into a proper form for power supply storage, said electrical communication being further adapted with at least one relay within each electrical side of the connection between the electromagnetic coil of each said electromagnet and said power supply so that said relays can be closed to permit electrical current to flow through said electromagnetic coil or opened to prevent the flow of electrical energy from said electromagnetic coil; and controlling means for managing and controlling the storage, trapping, and release of electrical energy to achieve optimal timing and quantity of the delivery of electric current from said power supply to each said circumferential electromagnet, said controlling means further comprising sensors detecting and communicating the rate of rotation of said generator shaft, the position of each said permanent magnet, and any other data useful in determining the optimal times for release of said bursts of electric current and the amount of current to be released in each said burst of electric current, receivers to receive input signals from said sensors, and relays and switches adapted to facilitate said current release.

19. The rotational energy generating apparatus described in claim 18 in which each said permanent magnet is made of ferrite or ceramic or some ceramic and ferrous compound.

20. The rotational energy generating apparatus described in claim 1 in which said rotor further comprises a one or more balanced radial arms which are mounted integrally upon said shaft with said shaft at the rotational center of said rotor and in which said permanent magnets are positioned upon each said disk rotor arm with radial regularity about the disk rotor at its most distal points and in which said rotor further comprises a one or more balanced radial arms which are mounted integrally upon said shaft with said shaft at the rotational center of said rotor and in which said permanent magnets are positioned upon each said disk rotor arm with radial regularity about the disk rotor at its most distal points.

* * * * *